(12) United States Patent
Tsubamoto

(10) Patent No.: US 8,204,722 B2
(45) Date of Patent: Jun. 19, 2012

(54) SIMULATION APPARATUS, SIMULATION METHOD, AND SIMULATION PROGRAM

(75) Inventor: Daita Tsubamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 107 days.

(21) Appl. No.: 12/830,661

(22) Filed: Jul. 6, 2010

(65) Prior Publication Data

US 2011/0022364 A1    Jan. 27, 2011

(30) Foreign Application Priority Data

Jul. 22, 2009    (JP) .................................. 2009-171566

(51) Int. Cl.
*G06F 17/50* (2006.01)

(52) U.S. Cl. .............. 703/2; 703/16; 716/106; 716/126; 716/137; 716/110

(58) Field of Classification Search ................ 703/2, 16; 716/4, 5, 14, 126, 137, 106, 110
See application file for complete search history.

(56) References Cited

FOREIGN PATENT DOCUMENTS

| JP | 09-081602 A | 3/1997 |
|---|---|---|
| JP | 2001-331539 A | 11/2001 |
| JP | 2008-015636 A | 1/2008 |

*Primary Examiner* — Thai Phan
(74) *Attorney, Agent, or Firm* — Fujitsu Patent Center

(57) ABSTRACT

A disclosed device includes a simulation apparatus which simulates a shift in signal characteristics occurring in a wiring pattern formed in a printed wiring board including a first database that stores wiring pattern attribute information and wiring pattern positional information, a second database storing solid lack portion size information and solid lack portion positional information, a third database that stores shift amount information relative to positional relationships between the wiring patterns and the solid lack portions, a shift amount processing unit configured to obtain the shift amount of the signal characteristics in the wiring pattern corresponding to the wiring pattern attribute information which is input based on the wiring pattern positional information corresponding to the wiring pattern attribute information which is input, the solid lack portion positional information, the solid lack portion size information, and the shift amount information.

12 Claims, 30 Drawing Sheets

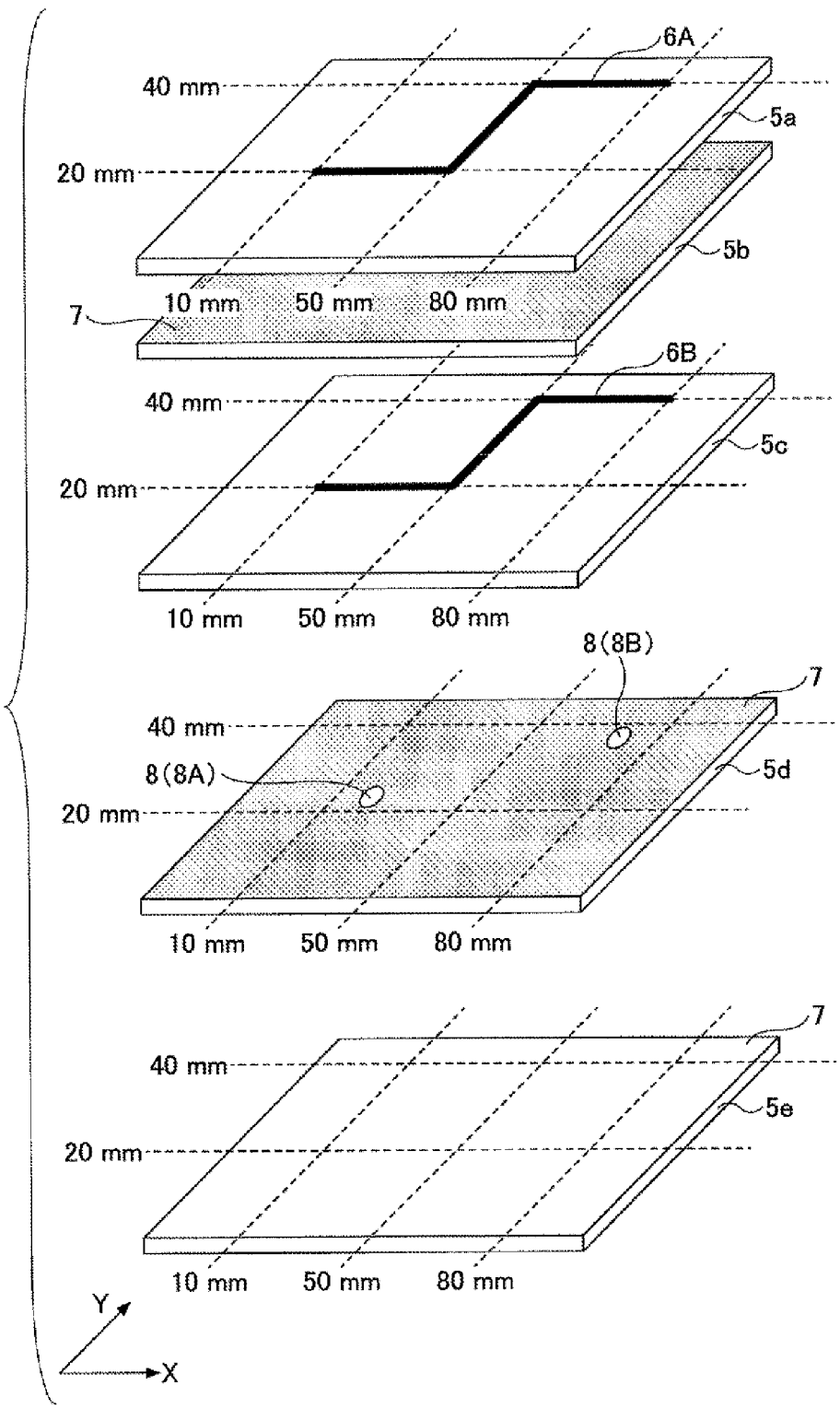

FIG.5A

| No. | LAYER | SIGNAL NAME | DATA RATE | ELECTRIC CONDUCTIVITY (S/m) | DIELECTRIC CONSTANT | WIRING WIDTH (mm) | WIRING THICKNESS (mm) | INTERLAYER DISTANCE (mm) | INTERLAYER WIRING HEIGHT (mm) | START COORDINATE POINT (mm) | | END COORDINATE POINT (mm) | |
|---|---|---|---|---|---|---|---|---|---|---|---|---|---|
| | | | | | | | | | | X | Y | X | Y |
| 1 | 1 | data001 | 1e** | 5×10³ | 3.8 | 0.1 | 0.035 | 0.255 | 0.1 | 10 | 20 | 50 | 20 |
| 2 | 1 | data001 | 1e** | 5×10³ | 3.8 | 0.1 | 0.035 | 0.255 | 0.1 | 50 | 20 | 50 | 40 |
| 3 | 1 | data001 | 1e** | 5×10³ | 3.8 | 0.1 | 0.035 | 0.255 | 0.1 | 50 | 40 | 80 | 40 |
| 4 | 1 | data001 | 1e** | 5×10³ | 3.8 | 0.1 | 0.035 | 0.255 | 0.1 | 10 | 20 | 50 | 20 |
| 5 | 3 | data001 | 1e** | 5×10³ | 3.8 | 0.1 | 0.035 | 0.255 | 0.1 | 50 | 20 | 50 | 40 |
| 6 | 3 | data001 | 1e** | 5×10³ | 3.8 | 0.1 | 0.035 | 0.255 | 0.1 | 50 | 40 | 80 | 40 |
| ... | ... | ... | ... | ... | ... | ... | ... | ... | ... | ... | ... | ... | ... |
| n | 5 | data*** | 1e** | 5×10³ | 3.8 | — | 0.035 | 0.255 | 0.1 | — | — | — | — |

FIG.5B

| No. | LAYER | DIAMETER (mm) | CENTER COORDINATE POINT (mm) | |
|---|---|---|---|---|
| | | | X | Y |
| 1 | 4 | 3.0 | 30 | 22.5 |
| 2 | 4 | 3.0 | 70 | 37.5 |
| ⋮ | ⋮ | ⋮ | ⋮ | ⋮ |
| n | — | 3.0 | — | — |

FIG.7

| No. | LAYER | ONE SIDE | BOTH SIDES | IMMEDIATELY ABOVE / IMMEDIATELY BELOW | SAME LAYER / IMMEDIATELY ABOVE / IMMEDIATELY DOWN | DETERMINATION |
|---|---|---|---|---|---|---|
| - | - | 1 | 0 | 0 | 1 | SOLID LACK PORTION ON ONE SIDE |
| - | - | 1 | 0 | 0 | 0 | NO SOLID LACK PORTION |
| - | - | 0 | 0 | 1 | 1 | SOLID LACK PORTIONS DIRECTLY ABOVE AND DIRECTLY BELOW |
| - | - | 1 | 0 | 0 | 1 | SOLID LACK PORTION ON ONE SIDE |
| - | - | 1 | 0 | 0 | 0 | NO SOLID LACK PORTION |
| - | - | 0 | 1 | 0 | 1 | SOLID LACK PORTIONS ON BOTH SIDES |
| - | - | 0 | 0 | 1 | 1 | SOLID LACK PORTIONS IMMEDIATELY ABOVE AND IMMEDIATELY BELOW |

FIG.11

| X COORDINATE POINT (mm) | Y COORDINATE POINT (mm) | EXISTENCE OF SOLID LACK PORTION |
|---|---|---|
| 28.5 | 20.5 | 0 |
| 28.5 | 21.0 | 1 |
| 28.5 | 21.5 | 1 |
| 29.0 | 20.5 | 0 |
| 29.0 | 21.0 | 1 |
| 29.0 | 21.5 | 1 |
| 29.5 | 20.5 | 0 |
| 29.5 | 21.0 | 1 |
| 29.5 | 21.5 | 1 |
| 30.0 | 20.5 | 0 |
| 30.0 | 21.0 | 1 |
| 30.0 | 21.5 | 1 |
| 30.5 | 20.5 | 0 |
| 30.5 | 21.0 | 1 |
| 30.5 | 21.5 | 1 |
| 31.0 | 20.5 | 0 |
| 31.0 | 21.0 | 0 |
| 31.0 | 21.5 | 1 |

FIG.13

| No. | LAYER | X COORDINATE POINT (mm) | Y COORDINATE POINT (mm) | CHARACTERISTIC IMPEDANCE (Ω) |
|---|---|---|---|---|
| — | — | — | — | — |
| 1 | 3 | 28.5 | 20.0 | 54 |
| 1 | 3 | 29.0 | 20.0 | 54 |
| 1 | 3 | 29.5 | 20.0 | 54 |
| 1 | 3 | 30.0 | 20.0 | 54 |
| 1 | 3 | 30.5 | 20.0 | 54 |
| 1 | 3 | 31.0 | 20.0 | 52 |
| — | — | — | — | — |
| — | — | — | — | — |

FIG.21

| DIELECTRIC CONSTANT | DISTANCE BETWEEN WIRING PATTERNS (mm) | NOISE PER UNIT AREA (mV) |
|---|---|---|
| 3.5 | 0.5 | 20 |
| | 1.0 | 15 |
| | 1.5 | 10 |
| 4.0 | 0.5 | 25 |
| | 1.0 | 20 |
| | 1.5 | 15 |
| 4.5 | 0.5 | 30 |
| | 1.0 | 25 |
| | 1.5 | 20 |

FIG.22

| DISTANCE BETWEEN WIRING PATTERNS (mm) | DISTANCE BETWEEN WIRING PATTERN AND SOLID LACK PORTION (mm) (REMAINING SOLID PATTERN) | CORRECTION COEFFICIENT |
|---|---|---|
| 0 | 0 | 1 |
| 0 | 0.1 | 0.9 |
| 0 | 0.2 | 0.8 |
| 0.1 | 0 | 0.9 |
| 0.1 | 0.1 | 0.8 |
| 0.1 | 0.2 | 0.7 |
| 0.2 | 0 | 0.8 |
| 0.2 | 0.1 | 0.7 |
| 0.2 | 0.2 | 0.6 |

FIG.24

| X COORDINATE POINT (mm) | Y COORDINATE POINT (mm) | EXISTENCE OF SOLID LACK PORTION | DISTANCE BETWEEN WIRING PATTERNS (mm) |
| --- | --- | --- | --- |
| 28.5 | 20.5 | 0 | – |
| 28.5 | 21.0 | 0 | – |
| 28.5 | 21.5 | 0 | – |
| 29.0 | 20.5 | 0 | – |
| 29.0 | 21.0 | 1 | 1.0 |
| 29.0 | 21.5 | 0 | – |
| 29.5 | 20.5 | 0 | – |
| 29.5 | 21.0 | 1 | 1.0 |
| 29.5 | 21.5 | 0 | – |
| 30.0 | 20.5 | 0 | – |
| 30.0 | 21.0 | 1 | 1.0 |
| 30.0 | 21.5 | 0 | – |
| 30.5 | 20.5 | 0 | – |
| 30.5 | 21.0 | 1 | 1.0 |
| 30.5 | 21.5 | 0 | – |
| 31.0 | 20.5 | 0 | – |
| 31.0 | 21.0 | 0 | – |
| 31.0 | 21.5 | 0 | – |

SIMULATION APPARATUS, SIMULATION METHOD, AND SIMULATION PROGRAM

CROSS-REFERENCE TO RELATED APPLICATIONS

This patent application is based upon and claims the benefit of priority of the prior Japanese Patent Application No. 2009-171566 filed on Jul. 22, 2009, the entire contents of which are incorporated herein by reference.

FIELD

A certain aspect of the embodiments discussed herein is related to a simulation apparatus, a simulation method and a simulation program which simulate signal characteristic changes caused by vacancy in patterns of wiring patterns formed on printed wiring boards.

BACKGROUND

High-density packages are ordinarily used due to increased numbers of the electronic elements actually installed on printed wiring boards and reduced size of printed wiring boards.

The more the high-density packages are used, the more the routes of electric currents in the printed wiring boards complicated. Thus, problems such as impedance mismatching and crosstalk are apt to occur. More advanced circuitry designs are in prospect for these printed wiring boards.

Circuitry designs for the printed wiring boards having high-density packages may be accompanied by a vast amount of calculations. Therefore, various apparatuses may be used in supporting the circuitry design. Examples of the various apparatuses are an apparatus for calculating appropriate wiring structures, an apparatus for calculating areas of wiring patterns, and an apparatus for producing equivalent circuit models by considering minute vacancies in patterns (openings).

[Patent Document 1] Japanese Laid-open Patent Publication No. 2001-331539
[Patent Document 2] Japanese Laid-open Patent Publication No. 09-81602
[Patent Document 1] Japanese Laid-open Patent Publication No. 2008-15636

SUMMARY

According to an aspect of the embodiment, there is provided a simulation apparatus which simulates a shift in signal characteristics occurring in a wiring pattern formed in a printed wiring board, the simulation apparatus including a first database that stores wiring pattern attribute information indicative of attributes of wiring patterns and wiring pattern positional information indicative of positions of the wiring patterns while associating the wiring pattern attribute information with the wiring pattern positional information, a second database that stores solid lack portion size information indicative of sizes of solid lack portions and solid lack portion positional information indicative of positions of the solid lack portions while associating the solid lack portion size information with the solid lack portion positional information, a third database that stores shift amount information indicative of a shift amount of the signal characteristics relative to positional relationships between the wiring patterns and the solid lack portions, an input unit configured to input the wiring pattern attribute information, and a shift amount processing unit configured to obtain the shift amount of the signal characteristics in the wiring pattern corresponding to the wiring pattern attribute information input with the input unit based on the wiring pattern positional information corresponding to the wiring pattern attribute information input with the input unit, the solid lack portion positional information, the solid lack portion size information, and the shift amount information.

The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF THE DRAWINGS

FIG. 4 is an example exploded perspective view for illustrating the structure of a printed wiring board to be calculated for supporting a wiring design using the simulation apparatus of Embodiment 1;

FIG. 5A illustrates example CAD data used by the simulation apparatus of Embodiment 1;

FIG. 5B illustrates other example CAD data used by the simulation apparatus of Embodiment 1;

FIG. 7 is an example table illustrating positional relationships between wiring patterns and solid lack portions used in the simulation apparatus of Embodiment 1;

FIG. 11 illustrates an example result determined by the calculation illustrated in FIG. 10;

FIG. 13 illustrates a calculation result of the characteristic impedances in the sections of the wiring pattern obtained by the simulation apparatus of Embodiment 1;

FIG. 21 is a table illustrating the strength of cross talk in unit areas of cross talk regions which are used in the simulation apparatus of Embodiment 2;

FIG. 22 is an example table of correction coefficients used in calculating the strength of cross talk in the simulation apparatus of Embodiment 2;

FIG. 24 is an example table including results of determination illustrated in FIG. 23 and results of extracting distances between wiring patterns;

DESCRIPTION OF EMBODIMENTS

As described, the apparatus for generating equivalent circuit models by removing minute vacancies in patterns has been used in supporting circuitry designs. However, degradation in signal characteristics of high speed signals may occur even when a minute vacancy exists in a pattern.

Preferred embodiments of the present invention will be explained with reference to accompanying drawings.

Embodiment 1

Figure 1:
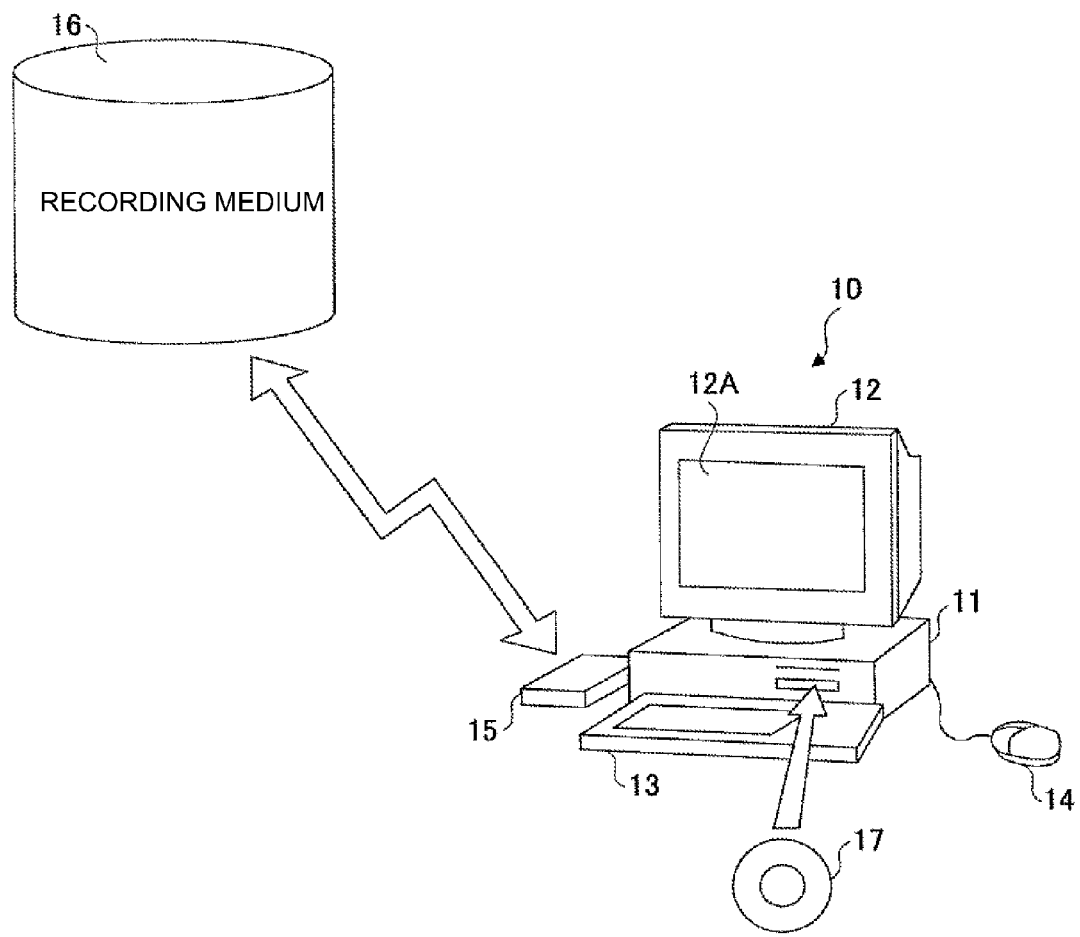
FIG. 1 schematically illustrates a computer system in which a simulation apparatus of Embodiment 1 is demonstrated.

FIG. 1 schematically illustrates a computer system in which a simulation apparatus of Embodiment 1 is demonstrated. A computer system 10 includes a main body 11, a display 12, a keyboard 13, a mouse 14 and a modem 15.

The main body 11 includes a central processing unit (CPU), a hard disk drive (HDD), a disk drive or the like. The display 12 is a display unit for displaying an analysis result or the like on the display screen 12A upon receipt of an instruction from the main body 11. The display 12 may be a liquid crystal display. The keyboard 13 is an input unit that enables the computer system to input various information pieces. The mouse 14 is an input unit for pointing at an arbitrary position on the display screen 12A of the display 12. The modem 15 downloads programs or the like stored in other computer systems by accessing external databases or the like.

A simulation program (simulation program software or tool) causing the computer system 10 to function as a supporting unit in designing printed wiring boards is stored in a removable recording medium such as a disk 17 or downloaded from a recording medium 16 of another computer system. The simulation program is input in the computer system 10 and compiled.

The simulation program causes a CPU 21 (see FIG. 2) of the computer system 10 to function as a simulation apparatus having the supporting function in designing wirings of the printed wiring boards. The simulation program may be stored in a computer readable recording medium such as the disk 17 which can be read by computers. The computer readable recording media are not limited to removable recording media such as magnetic disks like the disk 17, an IC card memory, and a floppy disk ("floppy disk" is the registered trademark), an opto-magnetic disk and a CD-ROM. The computer readable recording media may be various recording media which are accessible with computer systems connectable through the modem 15 or a communication device such as a LAN.

Figure 2:
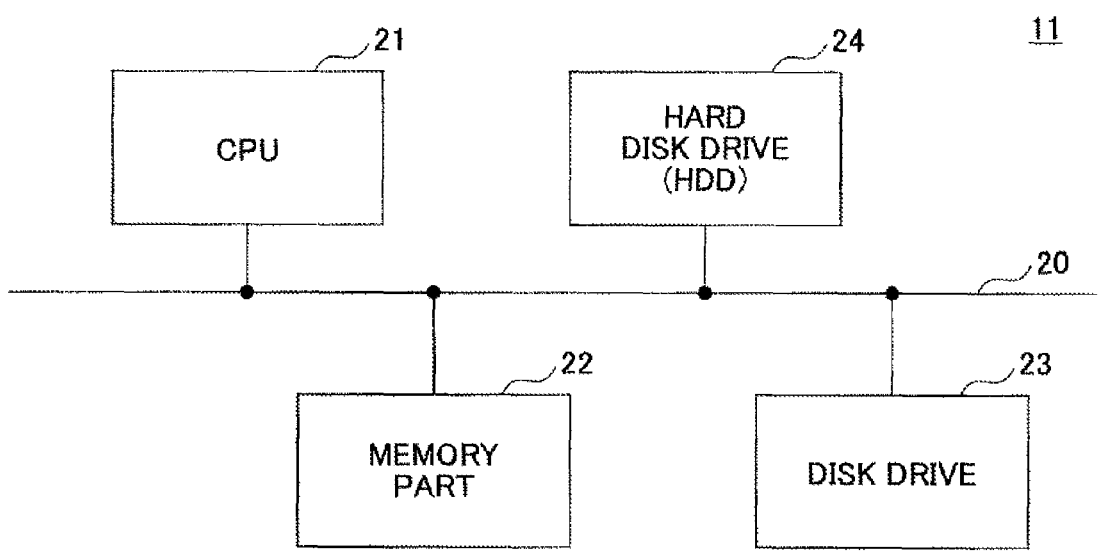
FIG. 2 is an example block diagram for illustrating an important portion of the main body of a computer system.

FIG. 2 is an example block diagram for illustrating an important portion of the main body 11 of the computer system 10. The main body 11 includes the processor (CPU) 21, a memory part 22 including a RAM or a ROM, a disk drive 23 used for the disk 17, and a hard disk drive (HDD) 24. Although the display 12, the keyboard 13 and the mouse 14 are connected to the CPU 21 via a bus 20 in Embodiment 1, the display 12, the keyboard 13 and the mouse 14 may be directly connected to the CPU 21. The display 12 may be connected to the CPU 21 via a known graphic interface (not illustrated) for processing input and output image data.

The keyboard 13 and the mouse 14 are the input units of the simulation apparatus in the computer system 10. The display 12 is the display unit for displaying calculation results obtained by the supporting function in designing the wirings of the printed wiring boards. The CPU 21 functions as a shift amount processing unit for obtaining a shift amount of signal characteristics in a wiring pattern corresponding to an attribute input in the input unit based on positional information of the wiring pattern corresponding to the attribute input in the input unit, positional information of a vacancy in a pattern region, size information of the vacancy in the pattern region, and shift amount information.

The computer system 10 is not limited to the structures illustrated in FIG. 1 and FIG. 2, and may have another element or may be partly replaced by another structure.

Figure 3A:
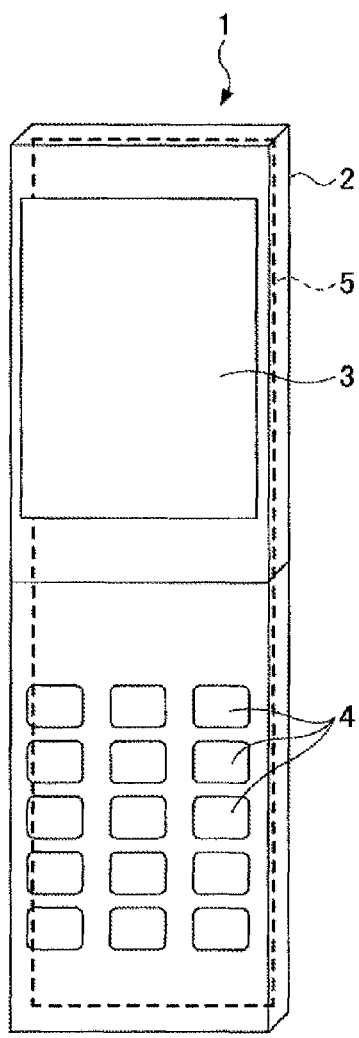
FIG. 3A is an example perspective view of an electronic apparatus, in which a wiring design of a printed wiring board of the electronic apparatus is calculated by the simulation apparatus of Embodiment 1 for supporting the wiring design.
Figure 3B:
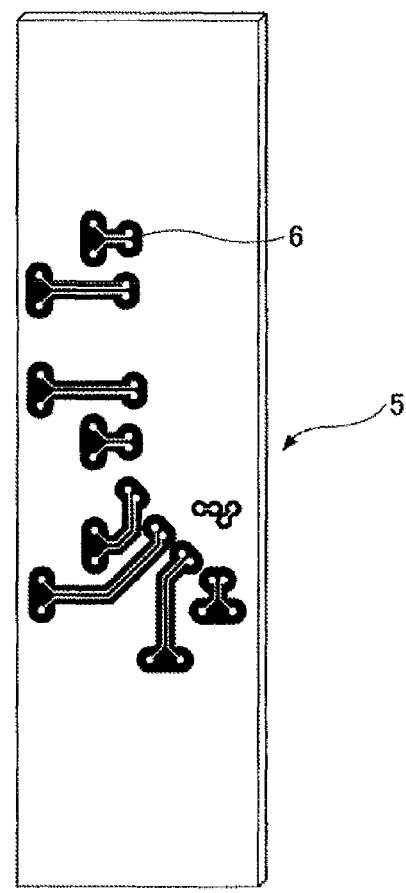
FIG. 3B is an example perspective view of the printed wiring board of the electronic apparatus illustrated in FIG. 3A.

FIG. 3A is an example perspective view of an electronic apparatus, for which a wiring design of a printed wiring board is calculated by the simulation apparatus of Embodiment 1 for supporting the wiring design. FIG. 3B is an example perspective view of the printed wiring board of the electronic apparatus illustrated in FIG. 3A. In Embodiment 1, a portable phone 1 is exemplified as the electronic apparatus.

Referring to FIG. 3A, a display unit 3 and an operation unit 4 are provided on an outer surface of a casing 2. Referring to FIG. 3B, a printed wiring board 5 indicated by a dashed line in FIG. 3A is accommodated inside the casing 2.

The casing 2 is made of a resin or a metal and has an opening for mounting the display unit 3 and the operation unit 4. The display unit 3 includes any liquid crystal panel which can display characters, numbers, images and the like. The operation unit 4 includes various selection keypads for selecting functions of the portable phone 1 in addition to numeric keypads. The portable phone 1 may include a proximity communication device such as an infrared ray communication device and a communication device for electronic money (e-money) and accessory equipment such as a camera.

The printed wiring board 5 illustrated in FIG. 3B is made of a FR4 (glass-fabric based epoxy-resin) substrate. The wiring pattern 6 is formed by patterning a copper foil on a surface of the printed wiring board 5. The wiring pattern 6 is a transmission path of various signals necessary for driving the electronic apparatus. The wiring pattern 6 is patterned by etching using, for example, a resist.

The integrated circuit (IC), a memory or the like necessary for telephone calls, e-mail, Internet communication or the like is electrically connected to the wiring pattern 6 of the portable phone 1.

The FR4 substrate used as the printed wiring board 5 ordinarily has laminated plural insulating layers and copper foils which are patterned and provided in interlayers between the plural insulating layers, the uppermost layer and the lowermost layer in the laminated plural insulating layers.

The wirings and circuits necessary for telephone calls, e-mail, Internet communication or the like may be formed on the interlayers and the lowermost layers of the FR4 substrate in the portable phone 1.

The printed wiring board 5 may be a substrate other than FR4 as long as the substrate is made of a dielectric material on which a wiring pattern 6 is formed or a circuit is mounted.

The wiring pattern 6 may be a metal other than copper (Cu) as long as the metal has small power attenuation and high electric conductivity such as aluminum (Al).

Computer Aided Design (CAD) data for the wiring patterns 6 formed on the printed wiring boards 5 are stored in the HDD 24 illustrated in FIG. 2.

The printed wiring board 5 may be formed of laminated plural layers and may have solid patterns for ground (GND) and a power source. This is described in reference to FIG. 4.

FIG. 4 is an example exploded perspective view for illustrating the structure of a printed wiring board to be calculated for supporting a wiring design using the simulation apparatus of Embodiment 1.

The printed wiring board 5 illustrated in FIG. 4 has a five-layer structure. The printed wiring board 5 includes the wiring pattern 6 and the solid pattern 7. In the printed wiring board 5 illustrated in FIG. 4, the wiring pattern 6 is formed on at least one of the dielectric layers 5a to 5e, and the solid pattern 7 is formed on at least one of the rest of the dielectric layers 5a to 5e. The dielectric layers 5a to 5e are made of one of a core material and a bonding layer.

The wiring pattern 6 is a wiring or a predetermined pattern for transmitting signals. The solid pattern 7 is two-dimensionally shaped, is maintained to have ground potential, and functions as a return path of transmission signals. Therefore, it is preferable to design the wiring pattern 6 and the solid pattern 7 so that signal characteristics of the wiring pattern 6 become good (i.e. typically, a state in which impedance matching is attained, for example 50Ω).

Referring to FIG. 4, the uppermost layer of the five layers is the dielectric layer 5a, the second layer is the dielectric layer 5b, the third layer is the dielectric layer 5c, the fourth layer is the dielectric layer 5d, and the lowermost layer is the dielectric layer 5e. These layers 5a to 5e are separately illustrated. The wiring pattern 6A is formed on the dielectric layer 5a. The wiring pattern 6B is formed on the dielectric layer 5c. The solid patterns 7 are formed on the dielectric layers 5b and 5d. Solid lack portions 8A and 8B exist in the solid pattern 7 on the dielectric layer 5d. For example, the solid lack portions 8A and 8B are provided to enable interlayer wiring to pass through the solid lack portions 8A and 8B. In the following description, reference symbol 6 is used for the wiring patterns 6A, 6B, 6C . . . without discriminating these. In a similar manner thereto, reference symbol 8 is used for the solid lack portions 8A, 8B . . . without discriminating these.

Although the wiring pattern 6 on the dielectric layer 5e is omitted for convenience of explanation in FIG. 4, the layers having wiring patterns 6 and the layers having solid layers 7 are alternately laminated.

FIG. 4 illustrates a solid pattern 7 having ground potential. The printed wiring board 5 may include another solid pattern for supplying electric power having a predetermined positive or negative electric potential in addition to the solid pattern 7 having ground potential.

In the printed wiring board of the five-layer structure, the lowermost layer of the dielectric layer 5e is not always necessary. A wiring pattern 6 may be formed on a back surface of the dielectric layer 5d.

Referring to FIG. 5A and FIG. 5B, the coordinate points in the X and Y directions illustrated in FIG. 4 are described.

FIG. 5A illustrates example CAD data used by the simulation apparatus of Embodiment 1. FIG. 5B illustrates other example CAD data used by the simulation apparatus of Embodiment 1. The CAD data may include sizes of layers included in the printed wiring board 5; positions and sizes of via holes formed in the printed wiring board 5; and layer numbers, signal types, data rates, dielectric constants, electric conductivities, wiring widths, copper foil thicknesses, interlayer distances, wiring heights, start coordinate points, end coordinate points or the like.

Computer Aided Design (CAD) data for the wiring pattern 6 formed on the printed wiring board 5 are stored in the HDD 24 illustrated in FIG. 2.

The table illustrated in FIG. 5A is an example of a first database including mutually associated indexes of identifier (No.) of the wiring pattern 6, layer number, signal name, data rate, electric conductivity, dielectric constant, wiring width, wiring thickness, interlayer distance, wiring height, start coordinate point, end coordinate point or the like. The signal name designates the signal types transmitted through the wiring patterns 6, and is included in the first database as an example of attribute information indicative of the attributes of the wiring patterns 6. The wiring width, the wiring thickness, the interlayer distance, the wiring height, the start coordinate point and the end coordinate point are included in the first database as an example of the positional information of the wiring patterns 6. The interlayer distance designates a distance between the solid patterns 7.

Referring to FIG. 4, the interlayer distance represents a distance between the solid pattern 7 of the dielectric layer 5b and the solid pattern 7 of the dielectric layer 5d. The wiring height designates the height of the wiring pattern 6 relative to the solid pattern 7. Referring to FIG. 4, the wiring height corresponds to the height of the wiring pattern 6B on the dielectric layer 5c relative to the solid pattern 7 of the dielectric layer 5d.

The table illustrated in FIG. 5B is an example of a second database including mutually associated indexes of identifier (No.) of a solid lack portion of a solid pattern 7, layer number, diameter, and center coordinate point. The identifier (No.) of the solid lack portion of the solid pattern 7, the layer number, the diameter, and the center coordinate point are examples of the positional information of the solid lack portion 8 of the solid pattern 7.

The X-axis and Y-axis values of the start coordinate point and the end coordinate point illustrated in FIG. 5A and the X-axis and Y-axis values of the center coordinate point illustrated in FIG. 5B designate coordinate points on the X-axis and Y-axis coordinate plane.

The wiring patterns of the identifiers of No. 1 through No. 6 illustrated in FIG. 5A correspond to the wiring patterns 6A, 6B . . . formed on the dielectric layers 5a, 5b . . . illustrated in FIG. 4. The data signal having the signal name of "data001" is transmitted to the wiring patterns 6A and 6B.

The solid lack portions No. 1 and No. 2 of the solid pattern 7 illustrated in FIG. 5B correspond to the solid lack portions 8A and 8B formed on the dielectric layer 5d illustrated in FIG. 4.

The wiring pattern 6B and the solid lack portions 8A and 8B are contiguous as illustrated in FIG. 4. As to the positional relationships, the wiring pattern No. 4 illustrated in FIG. 5A and the solid lack portion No. 1 illustrated in FIG. 5B are contiguous. The wiring pattern No. 6 illustrated in FIG. 5A and the solid lack portion No. 2 illustrated in FIG. 5B are contiguous.

When the wiring pattern 6B and the solid lack portions 8A and 8B are contiguous, mismatching of the characteristic impedance in the wiring pattern 6B may occur. The mismatching of the characteristic impedance may cause degradation of signal characteristics.

The degradation of the signal characteristics in the wiring pattern 6 is caused by the solid lack portion 8 when the solid lack portion 8 exists in the dielectric layer 5c in which the wiring pattern 6 is formed, the dielectric layer 5b one layer upper than the dielectric layer 5c, or the dielectric layer 5d one layer lower than the dielectric layer 5c; and the solid lack portion 8 is contiguous to the wiring pattern 6 when FIG. 4 is transparently viewed in a direction orthogonal to the printed wiring board from the upper side to the lower side of FIG. 4 (when the printed wiring boards 5 are being transparently viewed in plan).

The simulation apparatus of Embodiment 1 obtains a wiring pattern (simulation model) having a large shift amount in its characteristic impedances by calculation in order to improve working efficiency in designing a wiring structure of a printed wiring board 5. Before calculating the shift amount of the characteristic impedances, a range in the width direction relative to the wiring pattern 6 is determined. The determination of the range in the width direction is described later in reference to FIG. 14. Next, the structure of the simulation apparatus of Embodiment 1 is described in reference to FIG. 6.

Figure 6:
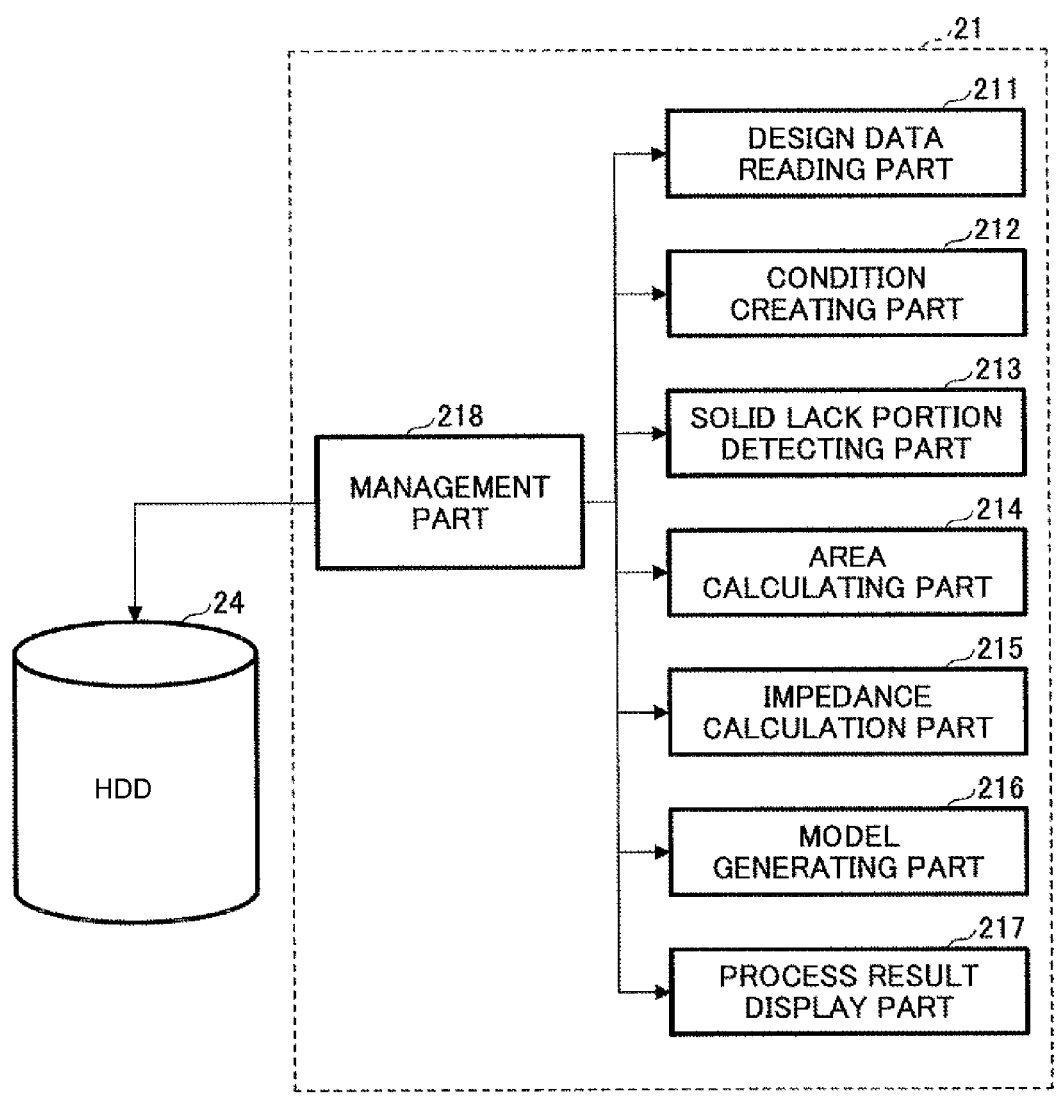
FIG. 6 is an example functional block diagram illustrating the simulation apparatus of Embodiment 1.

FIG. 6 is an example functional block chart illustrating the simulation apparatus of Embodiment 1. The function is demonstrated when the CPU 21 illustrated in FIG. 2 executes a simulation program stored in the HDD 24.

The functional block diagram of the CPU 21 includes a design data reading part 211, a condition creating part 212, a solid lack portion detecting part 213, an area calculating part 214, an impedance calculation unit 215, a model generating part 216, a process result display part 217 and a management part 218.

The design data reading part 211 reads the CAD data stored in the HDD 24.

The condition creating part 212 creates conditions for calculating shift amounts of characteristic impedances described later based on conditions input via the keyboard 13 or the mouse 14. The input conditions are, for example, a signal type (attribute information) transmitted through the wiring pattern 6, the range in the width direction in which the shift amount of the characteristic impedances are calculated, and a threshold value of the impedances for extracting the impedances to rank these.

The solid lack portion detecting part 213 classifies positional relationships between the wiring patterns 6 and the solid lack portions 8 when FIG. 4 is viewed in plan transparently from the upper side to the lower side of FIG. 4 based on the X and Y coordinate points of the wiring patterns 6 illustrated in FIG. 5A and the X and Y coordinate points of the solid lack portions 8 illustrated in FIG. 5B. Then, the solid lack portion detecting part 213 creates a classification result. A detailed description is given later in reference to FIG. 7.

The area calculating part 214 extracts the wiring pattern 6 in reference to the signal type (signal name) which is transmitted through the wiring pattern 6 and created by the condition creating part 212, and calculates the area of the solid lack portions 8 existing in the range in the width direction in which the characteristic impedance is calculated when the printed wiring boards 5 are being transparently viewed in plan (in the direction orthogonal to the printed wiring boards 5).

The impedance calculation unit 215 calculates the shift amounts of the characteristic impedances of the wiring pattern 6 to be calculated every predetermined section using the positional relationships between the wiring patterns 6 and the solid lack portions 8 and the areas of the solid lack portions 8 calculated by the area calculating part 214.

The model generating part 216 generates a wiring model visually indicative of distribution of the characteristic impedances of the wiring pattern 6 by integrating the shift amounts of the characteristic impedances of the predetermined sections calculated by the impedance calculation unit 215.

The process result display part 217 displays the calculation result obtained by the impedance calculation unit 215 or the wiring model (simulation model) generated by the model generating part 216 on the display screen 12A of the display 12 illustrated in FIG. 1. The contents of the display are described later.

The management part 218 administers storage of data in the HDD 24.

Next, determination of the positional relationships between the wiring patterns 6 and the solid lack portions 8 in the simulation apparatus of Embodiment 1 is described. The determination is carried out by the solid lack portion detecting part 213 illustrated in FIG. 6.

FIG. 7 is an example classification table illustrating positional relationships between wiring patterns 6 and solid lack portions 8 used in the simulation apparatus of Embodiment 1.

The solid lack portion detecting part 213 classifies the positions of the solid lack portions 8 on the solid pattern 7, when the printed wiring boards 5 are being transparently viewed in plan (in the direction orthogonal to the printed wiring boards 5), based on the X and Y coordinate positions of the wiring pattern 6 illustrated in FIG. 5A and the X and Y coordinate positions of the solid lack portions 8 illustrated in FIG. 5B.

The solid lack portion detecting part 213 determines whether the solid lack portion 8 exists in the layer including the wiring pattern 6, the layer one layer upper than the layer including the wiring pattern 6 or the layer one layer lower than the layer including the wiring pattern 6 (i.e. whether the solid lack portion 8 is apart from the wiring pattern 6 by two layers or more) in addition to the classification of the positional relationships when the printed wiring boards 5 are being transparently viewed in plan (in the direction orthogonal to the printed wiring boards 5).

Specifically, the solid lack portion detecting part 213 classifies the positions of the solid lack portions 8 relative to the wiring pattern 6, when the printed wiring boards 5 are being transparently viewed in plan (in the direction orthogonal to the printed wiring boards 5), by calculating the positional relationships between the start X and Y coordinate positions and the end X and Y coordinate positions of the sections of the wiring pattern 6 illustrated in FIG. 5A and the X and Y coordinate positions of the solid lack portions 8 illustrated in FIG. 5B. The positions of the solid lack portions 8 relative to the wiring pattern 6, when the printed wiring boards 5 are being transparently viewed in plan (in the direction orthogonal to the printed wiring boards 5), is classified as one of one side, both sides or immediately above/immediately below.

The solid lack portion detecting part 213 determines whether a value obtained by subtracting the layer number illustrated in FIG. 5B from the layer number illustrated in FIG. 5A is one of "0", "+1" and "−1". When the value is +2 or more or −2 or less, it is considered that another solid pattern 7 is formed between the wiring pattern 6 and the solid lack portions 8. Therefore, it is considered that there is no relationship causing signal characteristic degradation between the wiring pattern 6 and the solid lack portions 8.

With the above determination, the solid lack portion detecting part 213 classifies the positional relationships between the wiring pattern 6 and the solid lack portion 8, and creates a classification table indicative of the classification analysis illustrated in FIG. 7.

Figure 8:
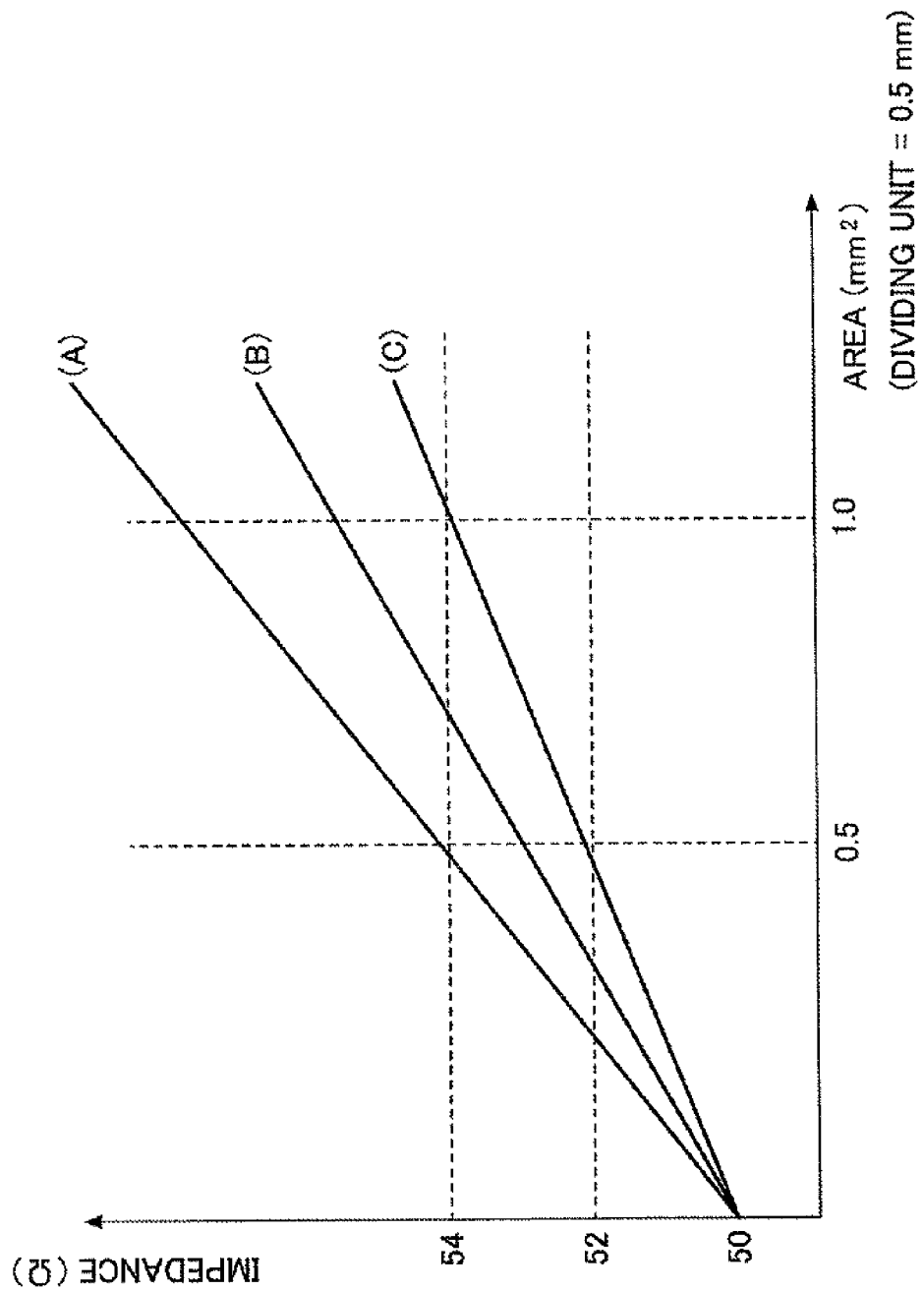
FIG. 8 is an example graph illustrating increment characteristics of characteristic impedances stored in the simulation apparatus of Embodiment 1.

FIG. 8 is a graph illustrating increment characteristics of characteristic impedances stored in a database 20 of the simulation apparatus of Embodiment 1. The data indicative of the increment characteristics of characteristic impedances are data used for calculating the shift amounts of the characteristic impedances. The data represent an increment or a decrement (degradation) of the characteristic impedances per unit area of the solder lack portion 8 with respect to the positional relationship between the wiring pattern 6 and the solid lack portion 8. The data indicative of the increment characteristics illustrated in FIG. 8 is an example of shift amount information indicative of the shift amounts of the signal characteristics of the wiring patterns relative to the positional relationship between the wiring pattern 6 and the solid lack portion 8 and the size of the solid lack portion 8. The data are stored in the HDD 24 as a third database.

The positional relationship between the wiring pattern 6 and the solid lack portion 8 is classified in three patterns of: (A) the solid lack portion 8 exists immediately above or immediately below the wiring pattern 6; (B) the solid lack portions 8 are positioned on both sides of the wiring pattern 6; and (C) the solid lack portion 8 exists only on one side of the wiring pattern 6. When it is presumed that the ideal characteristic impedance of the wiring pattern is 50Ω, degrees of impedance mismatching of the characteristic impedances are enhanced in an order of positional relationships (C), (B) and (A) in FIG. 8. Therefore, the characteristic impedance of the positional relationship (A) is the highest, and increment coefficients (gradients of the characteristics) are determined to be lowered in the order of the positional relationships (B) and (C).

With the simulation apparatus of Embodiment 1, the shift amount of the characteristic impedance of the wiring pattern 6 is calculated based on the area of the solid lack portion 8 existing in a range in which the shift amount of the characteristic impedances is calculated, and the positional relationship between the wiring pattern 6 and the solid lack portion 8.

Figure 9:
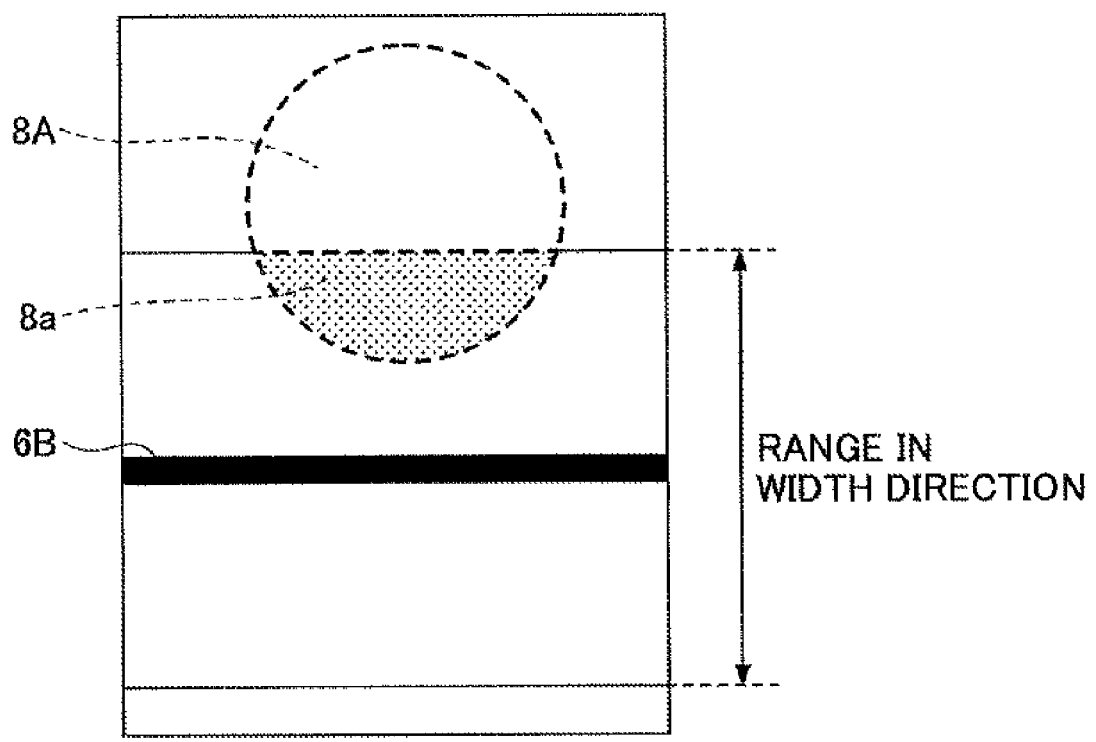
FIG. 9 illustrates a range in a width direction in which a shift amount of the characteristic impedance is calculated by the simulation apparatus of Embodiment 1 as an example.

FIG. 9 illustrates a range in a width direction in which a shift amount of characteristic impedances is calculated by the simulation apparatus of Embodiment 1. Referring to FIG. 9, the positional relationship between the wiring pattern 6B formed on the dielectric layer 5c and the solid lack portion 8A formed on the dielectric layer 5d and the range in the width direction to be calculated are illustrated by enlarging the range.

In the simulation apparatus of Embodiment 1, the shift amount of the characteristic impedances is calculated by previously determining the range in the width direction to be calculated.

The range in the width direction to be calculated is input via the computer 10 as a parameter input unit illustrated in FIG. 1.

It is presumed that the range in the width direction is determined to be 40 times (4.0 mm) the wiring width (0.1 mm) of the wiring pattern 6B.

Referring to FIG. 9, a part 8a (dotted line) of the solid lack portion 8A positioned in the vicinity of the wiring pattern 6B, when the printed wiring boards 5 are being transparently viewed in plan (in the direction orthogonal to the printed wiring boards 5), is within 4.0 mm from the wiring pattern 6B.

With the simulation apparatus of Embodiment 1, the shift amount of the characteristic impedances of the wiring pattern 6B caused by the portion 8a of the solid lack portion 8A which is included in the range in the width direction to be calculated. By obtaining the shift amount of the characteristic impedances, it is possible to obtain the influence on the signal characteristics of the wiring pattern 6B. By applying similar methods, influences on the signal characteristics of all the wiring patterns 6 are obtainable.

Figure 10:
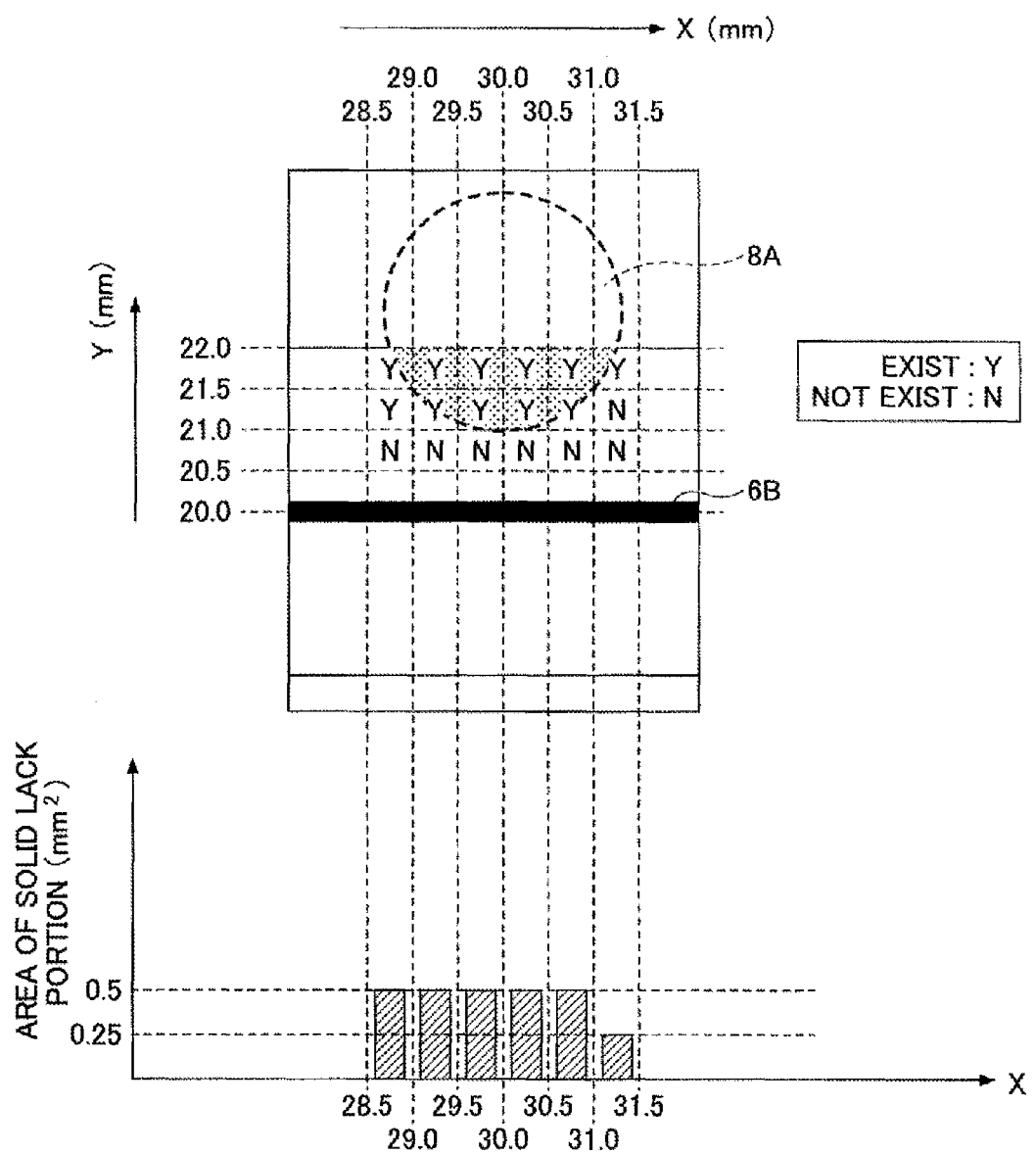
FIG. 10 illustrates example calculation of the area of a solid lack portion on a solid pattern existing in the range in the width direction, in which the characteristic impedance is calculated by the simulation apparatus of Embodiment 1.

FIG. 10 illustrates an example calculation of the area 8a of the solid lack portion 8A on the solid pattern 7 existing in the range in the width direction, in which the characteristic impedance is calculated by the simulation apparatus of Embodiment 1. The wiring pattern 6B and the solid lack portion 8A on the solid pattern are used in the explanation.

The solid lack portion detecting part 213 detects the solid lack portion 8A in the range in the width direction, the shift amount of the characteristic impedances of which is calculated, and calculates the area of the solid lack portion 8A based on a detection result of the solid lack portion detecting part 213.

In detecting the solid lack portion 8A and calculating the area of the solid lack portion 8A, a region in the range in the width direction to be calculated from a start coordinate point to an end coordinate point is divided to square meshes having a predetermined area. The wiring pattern 6B is divided into the lengths of the mesh sides. It is determined whether the solid lack portion 8A exists in every mesh.

In determining whether the solid lack portion 8A exists in the meshes, it is determined that the solid lack portion 8A exists in the mesh as "1" when the solid lack portion 8A exists in at least a part of the mesh. Said differently, when it is determined that the solid lack portion does not exist as "0", the solid lack portion 8A does not exist at all in the mesh to be determined.

The length of the mesh side is determined to be a value designated by Formula 1.

Length of mesh side=Rise time×Transmitting velocity/Arbitrary divided number     Formula 1

However, a drop time may be used instead of or in addition to the rise time.

In order to determine the length of the mesh side to be 0.5 mm, the wiring pattern 6B is divided into sections having 0.5 mm in their length direction. The area calculating part 214 calculates the areas of the solid lack portion 8A section by section.

The smallest coordinate point among the coordinate points of four corners of the meshes is used for the coordinate point of the mesh. For example, the value of the lower left coordinate point is used for the coordinate point of the mesh in FIG. 10.

Referring to FIG. 10, it is determined whether the solid lack portion 8A exists in the meshes included in the regions which are divided every 0.5 mm along the X-axis in the range of X=28.5 through 31.5 and Y=20.0 through 22.0. Further, referring to FIG. 10, symbols "Y" are inserted into the meshes in which the solid lack portion 8A is determined to exist, and numerical symbols "N" are inserted into the meshes in which the solid lack portion 8A is determined not to exist.

The areas of every section of the wiring pattern 6B are 0.5 mm$^2$ in the section of X=28.5 through 29.0; 0.5 mm$^2$ in the section of X=29.0 through 29.5; 0.5 mm$^2$ in the section of X=29.5 through 30.0; 0.5 mm$^2$ in the section of X=30.0 through 30.5; 0.5 mm$^2$ in the section of X=30.5 through 31.0; and 0.25 mm$^2$ in the section of X=31.0 through 31.5.

FIG. 11 illustrates an example result determined by the calculation illustrated in FIG. 10.

Flags "1" are given to the meshes in which the solid lack portion is determined to exist, and flags "0" are given to the meshes in which the solid lack portion is determined not to exist. These flags are used when the shift amounts of the characteristic impedances are calculated by the impedance calculation unit 215.

Referring to the determinations of FIG. 11, the areas of the solid lack portion in each section of the wiring pattern 6B are expressed as a value obtained by multiplying the number of the flags "1" by the unit area of the meshes of 0.25 mm$^2$.

The determination results of the wiring pattern 6B are illustrated in FIG. 11. However, determination results of all sections of the wiring patterns 6, which correspond to the attribute information created by the condition creating part 212, are obtainable in a similar manner.

Figure 12:
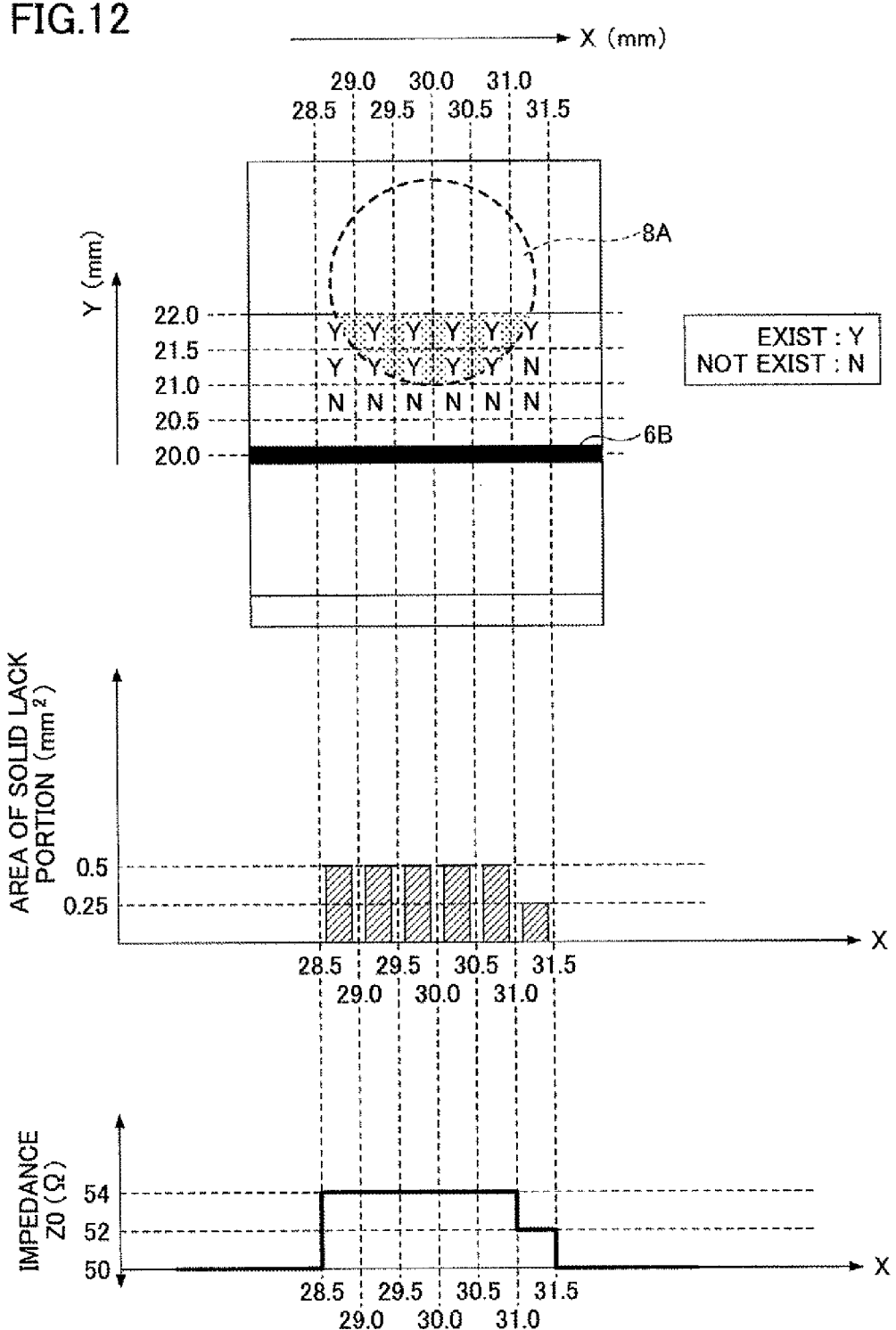
FIG. 12 illustrates the characteristic impedance of the wiring pattern influenced by the solid lack portion on the solid pattern illustrated in FIG. 10.

FIG. 12 illustrates the characteristic impedance of the wiring pattern 6B influenced by the solid lack portion 8A illustrated in FIG. 10. The impedance calculation unit 215 creates a graph of the impedance based on the characteristics illustrated in FIG. 8 and the determination results of the existence of the solid lack portion 8A relative to the X and Y coordinate points illustrated in FIG. 11.

The impedance calculation unit 215 calculates the characteristic impedances in the sections of the wiring pattern using the characteristics illustrated in FIG. 8 and the results illustrated in FIG. 11.

The characteristic impedances of the sections of the wiring patterns 6 are obtainable by Formula 2 as follows.

$$\text{Characteristic impedance} = \text{Increment coefficient} \times \text{Area of solid lack portion} + \text{Offset value} \quad \text{Formula 2}$$

The increment coefficient has any one of the characteristics (1) through (3) illustrated in FIG. 8. The offset value is determined as 50Ω.

Since the solid lack portion 8A is positioned on one side of the wiring pattern 6 relative to every section, when the characteristic (3) illustrated in FIG. 8 is used as the increment coefficient: 54Ω in the section of X=28.5 through 29.0; 54Ω in the section of X=29.0 through 29.5; 54Ω in the section of X=29.5 through 30.0; 54Ω in the section of X=30.0 through 30.5; 54Ω in the section of X=30.5 through 31.0; and 52Ω in the section of X=31.0 through 31.5.

In this way, the characteristic impedances of the sections of the wiring pattern 6B are obtained by the impedance calculation unit 215. The characteristic impedances may be similarly obtained for all wiring patterns 6 by the impedance calculation unit 215.

The model generating part 216 obtains the impedances of the wiring patterns 6 from the start coordinate points to the end coordinate points by integrating the values of the sections of the characteristic impedances obtained by the impedance calculation unit 215 from the start coordinate points to the end coordinate points of the wiring patterns 6.

FIG. 13 illustrates a calculation result of the characteristic impedances in the sections of the wiring pattern 6 obtained by the simulation apparatus of Embodiment 1. Referring to FIG. 13, the table illustrates data of the calculation result of the characteristic impedances of the wiring pattern 6B. After the data are calculated by the impedance calculation unit 215, the data are stored in the HDD 24. The X and Y coordinate points illustrated in FIG. 13 represent the start coordinate points of the sections of the wiring pattern 6B. FIG. 13 illustrates only the calculation result in the sections of (X, Y)=(28.5, 20.0) through (31.5, 20.0). However, all sections of the wiring patterns 6 designated by the attributes or the like may be calculated.

Next, the calculation method of supporting tests for printed wiring boards using the simulation apparatus of Embodiment 1 is described. Hereinafter, a description is given on a premise that a simulation program causing the computer system 1 to function as the simulation apparatus having a calculation function for supporting tests for the printed wiring boards is stored in the HDD illustrated in FIG. 2.

Figure 14:
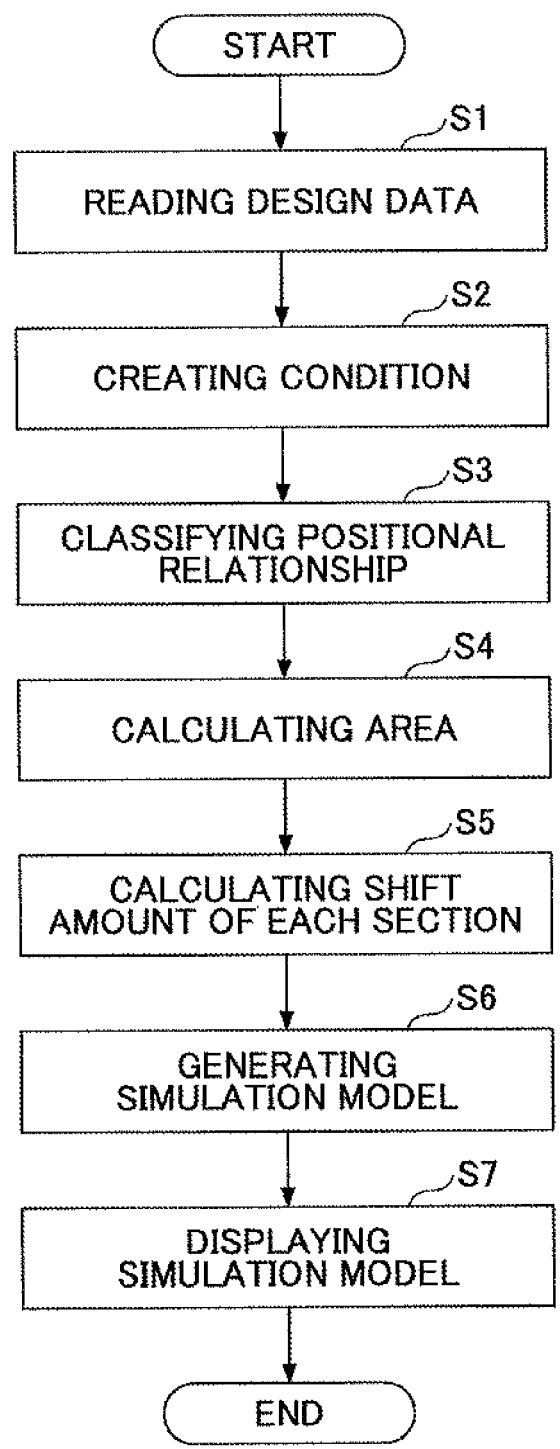
FIG. 14 is an example flow chart illustrating a calculation process for supporting tests for printed wiring boards carried out by the simulation apparatus of Embodiment 1.

FIG. 14 is an example flow chart illustrating a calculation process for supporting the tests for printed wiring boards carried out by the simulation apparatus of Embodiment 1. The CPU 21 executes the simulation program of Embodiment 1 to carry out the calculation illustrated in FIG. 14.

In step S1, the CPU 21 reads CAD data stored in the HDD 24 after starting the calculation. Step S1 is carried out by the design data reading part 211 included in the CPU 21. The CAD data illustrated in FIG. 5 are read out.

Then, in step S2, the CPU 21 creates conditions for calculating the shift amount of characteristic impedances. The process is to create the conditions for calculating the shift amount of the characteristic impedances based on the conditions input via the keyboard 13 or the mouse 14. Step S2 is carried out by the condition creating part 212 included in the CPU 21. The input conditions are, for example, signal types transmitted through the wiring patterns 6, the ranges in the width direction in which the shift amounts of the characteristic impedances are calculated, and threshold values of the impedances for extracting the impedances to rank these.

In step S3, the CPU 21 classifies positional relationships between the wiring patterns 6 and solid lack portion 8 when the printed wiring boards 5 are being transparently viewed in plan (in the direction orthogonal to the printed wiring boards 5), and creates data indicative of the classification result. Step S3 is to create a classification table illustrated in FIG. 7 based on the X and Y coordinate points of the wiring patterns 6 illustrated in FIG. 5A, and the X and Y coordinate points of the solid lack portions 8 illustrated in FIG. 5B. Step S3 is carried out by the solid lack portion detecting part 213 included in the CPU 21.

In step S4, the CPU 21 extracts the wiring patterns 6 corresponding to the signal types transmitted by the wiring patterns 6 and created by the condition creating part 212, and calculates the area of the solid lack portions 8 existing in the range in the width direction in which the shift amount of the characteristic impedances is calculated when the printed wiring boards 5 are being transparently viewed in plan (in the direction orthogonal to the printed wiring boards 5). Step S4 is carried out by the area calculating part 214.

In step S5, the CPU 21 calculates the shift amounts of the characteristic impedances of the wiring pattern 6 to be calculated using the positional relationship between the wiring pattern 6 and the solid lack portion 8 classified by the solid lack portion detecting part 213 and the area of the solid lack portion 8 calculated by the area calculating part 214 in step S5. Step S5 is carried out by the impedance calculation unit 215 included in the CPU 21. The shift amount of the characteristic impedances is calculated for each section of the wiring pattern 6, for example, each section divided every 0.5 mm being the length of the mesh side illustrated in FIG. 10.

In Step S6, the CPU 21 integrates the shift amounts of the characteristic impedances of the predetermined sections which are calculated in Step S5 from the start coordinate points to the end coordinate points to generate a simulation model of the wiring pattern 6. Step S6 is carried out by the model generating part 216 included in the CPU 21. The model generating part 216 integrates the values of the characteristic impedances of the sections, obtained by the impedance calculation unit 215 illustrated in FIG. 13.

In Step S7, the process result display part 217 displays the calculation result obtained by the impedance calculation unit 215 or the simulation model generated by the model generating part 216 on the display screen 12A of the display 12 illustrated in FIG. 1. The contents of the display are described later.

As described, a sequence of the processes carried out by the CPU 21 for calculating the shift amount of the characteristic impedances ends.

Figure 15:
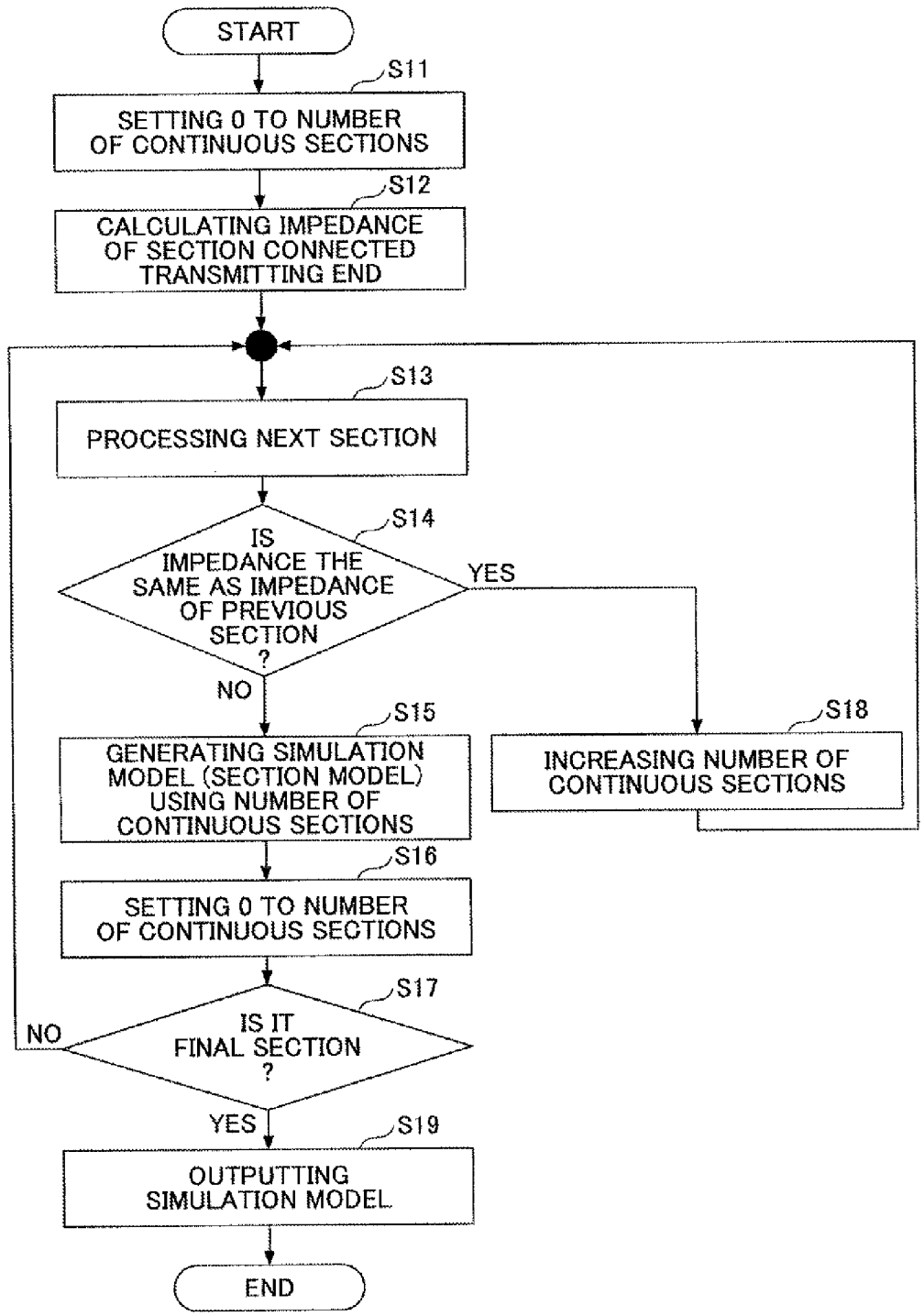
FIG. 15 is a flow chart illustrating an example process of calculating the characteristic impedances with a model generating part of the simulation apparatus of Embodiment 1.

FIG. 15 is a flow chart illustrating an example process of calculating the characteristic impedances with a model generating part 316 of the simulation apparatus of Embodiment 1.

It is presumed that a transmitter is connected to one end of the wiring pattern 6A indicated in FIG. 4 at coordinate points (X,Y)=(10, 20) and a receiver is connected to the other end of the wiring pattern 6A indicated in FIG. 4 at coordinate points (X,Y)=(80, 40). The one end is referred to as a transmitting end, and the other end is referred to as a receiving end.

When the values of the characteristic impedances of the sections are integrated in calculating the characteristic impedances, the number of the sections which have the same values of the characteristic impedances are referred to as the number of continuous sections.

In step S11, when the process is started, the model generating part 216 sets "0" to the number of the continuous sections.

In step S12, the model generating part 216 sets an initial value for integration to the characteristic impedance of the section connected to the transmitting end. The value of the characteristic impedance in the first section having the length of 0.5 mm of the wiring pattern 6A and being connected to the transmitting end is read from the HDD 24. The read value is set as the initial value of the calculation.

In step S13 after step S12 ends, the model generating part 216 processes the next section. The model generating part 216 integrates the value of the characteristic impedance of the next section.

In step S14, the model generating part 216 determines whether the value of the characteristic impedance of the section is the same as the characteristic impedance of the previous section in step S12.

In step S15, in a case where the model generating part 216 determines that the values of the characteristic impedances are not the same, the model generating part 216 generates a simulation model using the sections processed by then. The simulation model is temporarily stored in a RAM of the memory part 22 or the like. The simulation model is described later in reference to FIG. 16.

In step S16, the model generating part 216 sets "0" to the number of continuous sections.

In step S17, when step S16 ends the model generating part 216 determines whether the final section is processed. When the final section is not processed yet, the process goes back to step S13.

In a case where the model generating part 216 determines that the value of the characteristic impedance of the currently processed section is not the same as the value of the characteristic impedance of the previously processed section in step S14, the model generating part 216 adds "1" to (increments) the number of continuous sections. Then, the flow is returned to step S13. Step S14 determines whether the section currently processed is still continuous to the previously processed section.

In step S19, in the case where the model generating part 216 determines that the currently processed section is the final section in step S17, the simulation model generated by then and stored in the memory part 22 is output. Thus, the process of generating the simulation model (wiring model) with the model generating part 216 ends.

Figure 16:
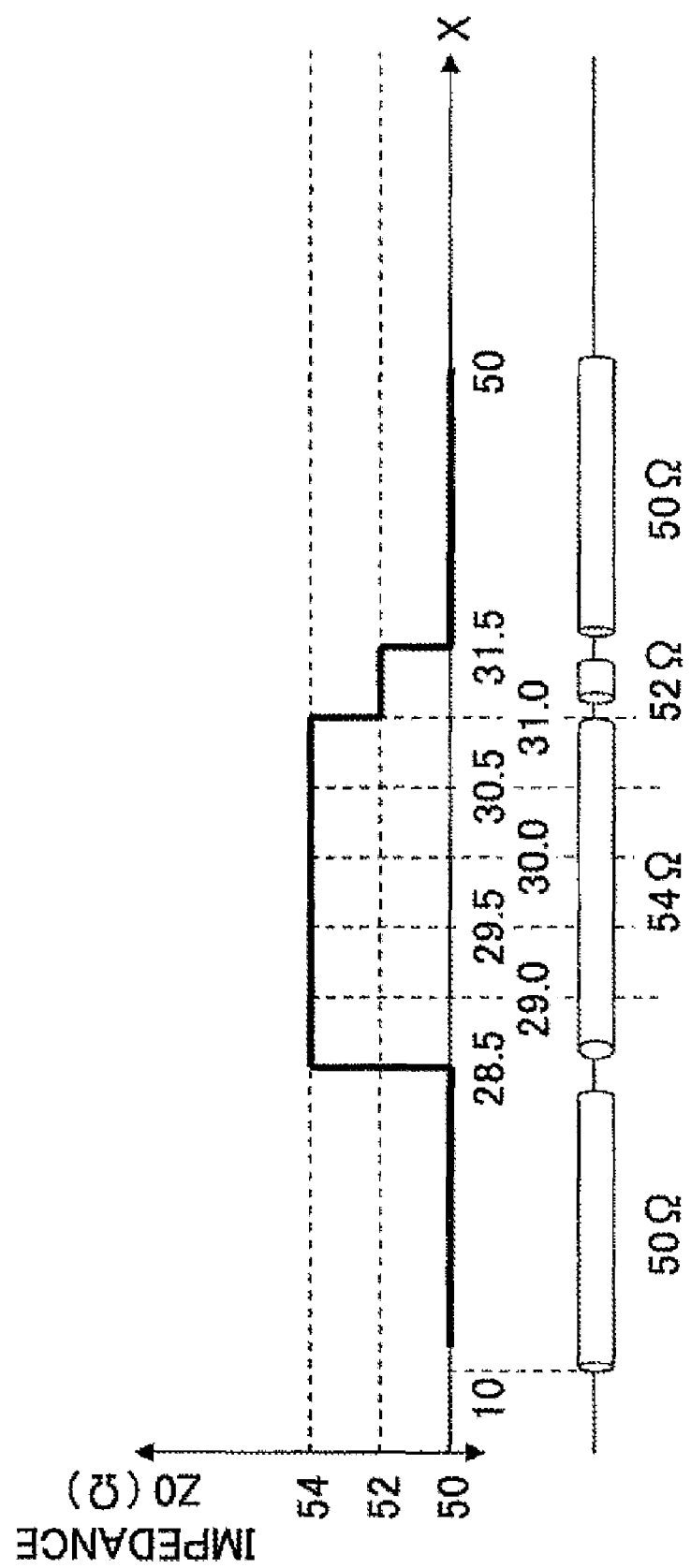
FIG. 16 illustrates an example simulation model (wiring model) created by the simulation apparatus of Embodiment 1.

FIG. 16 illustrates an example simulation model (wiring model) generated by the simulation apparatus of Embodiment 1. The simulation model of the wiring pattern 6B of No. 4 at the coordinate points of (X, Y)=(10, 20) through (50, 20) is illustrated in FIG. 16. The sections of which values of the characteristic impedances are the same are expressed as a continuous simulation model (section model). At points where the values of the characteristic impedances change, the simulation models (section model) discontinue.

The simulation model (wiring model) illustrated in FIG. 16 and generated by the model generating part 216 is displayed on the display screen 12A of the display 12 illustrated in FIG. 1 by the process result display part 217.

As described, the simulation device of Embodiment 1 may calculate the shift amount of the characteristic impedances including influences of minute solid lack portions 8 near the wiring pattern 6 using the CAD data. Therefore, it is possible to design wirings of a printed wiring board which transmit high speed signals in consideration of a minute signal characteristic change.

Especially, when the wiring patterns which transmit relatively important signals are selected in advance from a large number of the wiring patterns 6, it is possible to specify the wiring pattern which has a large shift amount of the characteristic impedances and transmits the relatively important signal. Such an important wiring pattern transmitting the relatively important signal may be selected in reference to the attributes (signal types or signal names of transmitted signal) of the wiring patterns 6. Therefore, it is unnecessary to calculate for all of the wiring patterns 6. Therefore, it is possible to efficiently simulate the wiring pattern while reducing the number of the processes.

Further, since the shift amount of the characteristic impedances can be calculated by setting the range in the width direction of the wiring pattern 6, the amount of the calculations can be reduced. Thus, an efficient simulation can be carried out.

Further, since the shift amount of the characteristic impedances are calculated based on the area of the solid lack portions 8 of the solid pattern 7, it is possible to easily calculate the shift amount of the characteristic impedances using the CAD data.

The processes with the simulation apparatus of Embodiment 1 may be partly changed as follows.

Figure 17A:
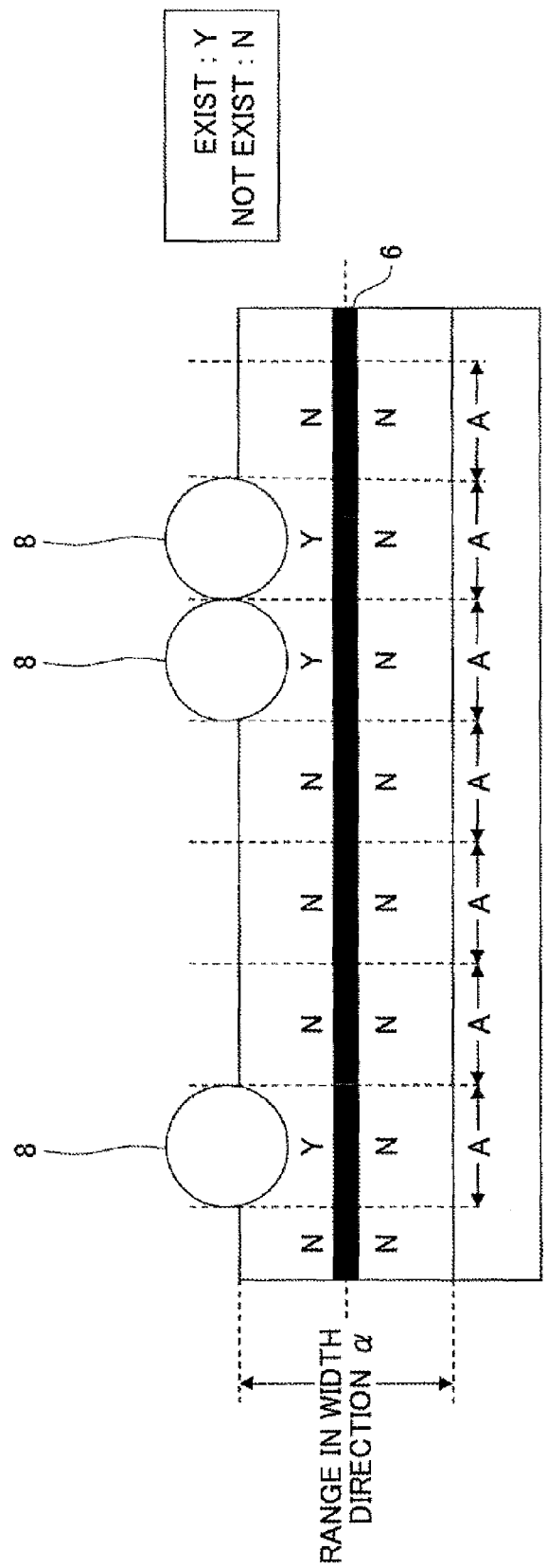
FIG. 17A and FIG. 17B illustrate another way of calculating the area of solid lack portions on a solid pattern with the simulation apparatus of Embodiment 1.
Figure 17B:
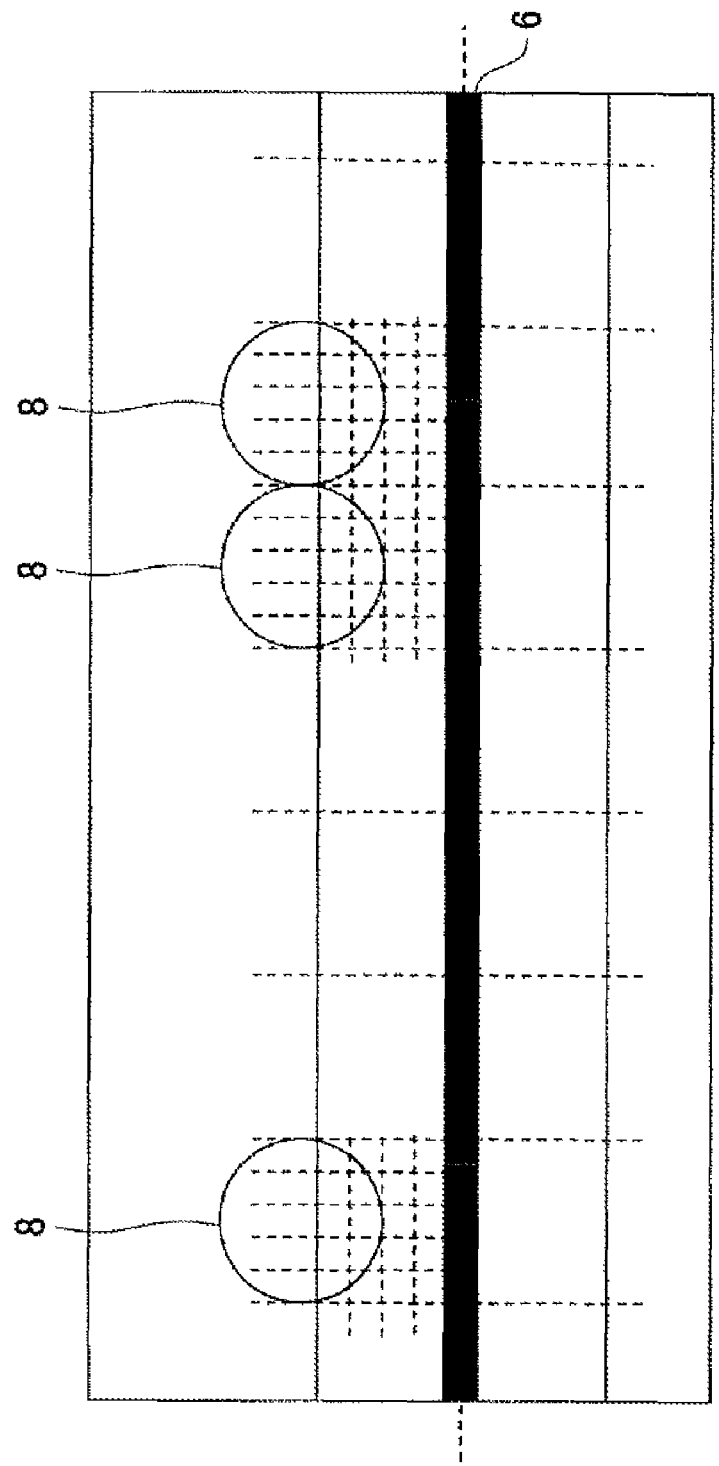

FIG. 17A and FIG. 17B illustrate another way of calculating the area of solid lack portions 8 on a solid pattern 7 with the simulation apparatus of Embodiment 1.

As described, the solid lack portion 8 in a range in a width direction is divided to meshes between the start coordinate point and the end coordinate point of the wiring pattern 6. The shift amount of characteristic impedances is obtained based on all of the unit areas. However, it is also possible to divide the wiring pattern 6 into plural sections having predetermined lengths A, determine whether the penetrating patterns exist in the sections as illustrated in FIG. 17A, and then divide the pattern into meshes as illustrated in FIG. 17B for the sections where the solid lack portions exist. Thereafter, the shift amount of the characteristic impedances may be calculated based on all of the unit areas.

Embodiment 2

A simulation apparatus of Embodiment 2 calculates a shift amount of signal characteristics caused by cross talk. Since the simulation apparatus of Embodiment 1 calculates the shift amount of the characteristic impedances, the use of the signal characteristics caused by cross talk in Embodiment 2 is different from the use of the characteristic impedances in Embodiment 1.

In a case where the wiring pattern 6B is contiguous to the solid lack portions 8A and 8B as illustrated in FIG. 4, and a wiring pattern 6C is formed on the lower-most dielectric layer 5e, which is positioned immediately below the dielectric layer 5d and is contiguous to the solid lack portions 8A and 8B, cross talk may occur between the wiring patterns 6B and 6C via the solid lack portions 8A and 8B. The cross talk may cause a change of signal characteristics.

Figure 18:
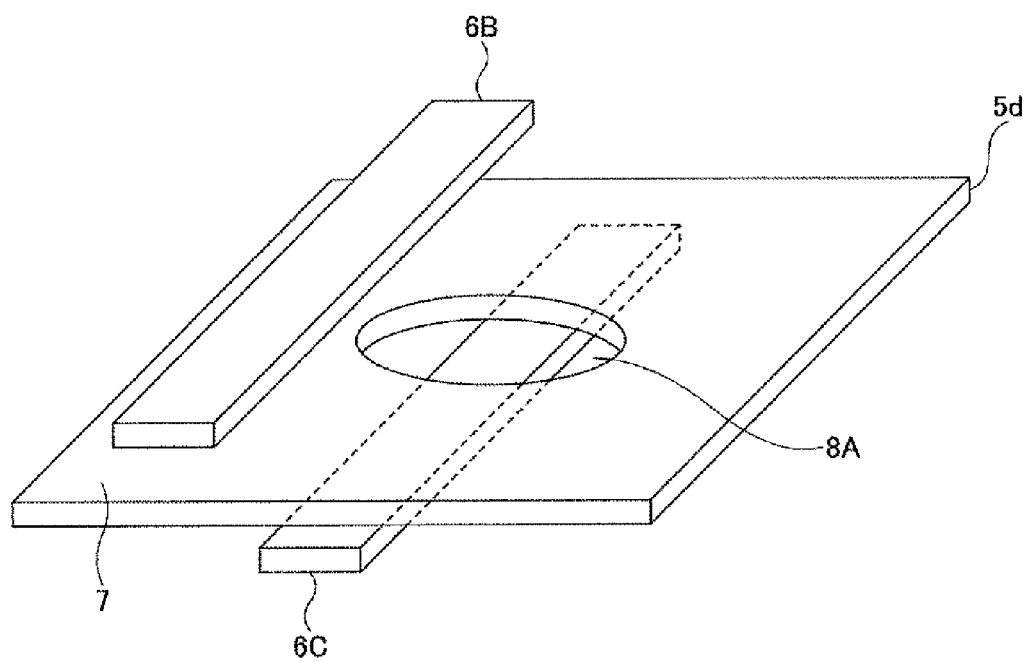
FIG. 18 is an example perspective view illustrating positional relationships between wiring patterns and a solid lack portion on a solid pattern.

FIG. 18 is an example perspective view illustrating positional relationships between the wiring patterns 6B and 6C and the solid lack portion 8A on the solid pattern 7. The wiring pattern 6B is formed in the third dielectric layer 5c. The solid lack portion 8A is formed on the solid pattern 7 on the fourth dielectric layer 5d. The wiring pattern 6C is formed on the fifth dielectric layer 5e. In FIG. 18, the dielectric layers 5c through 5e are omitted for convenience of the description.

Inside the solid lack portion 8A, a signal via hole or a ground via hole is formed. However, illustration of the signal via hole and the ground via hole is omitted for convenience of the description.

Figure 19:
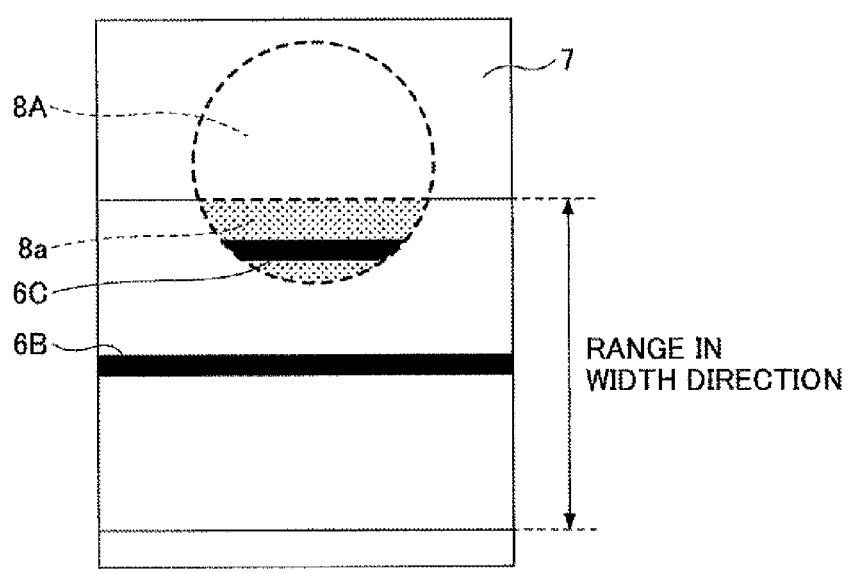
FIG. 19 schematically illustrates example positional relationships between the wiring patterns and the solid lack portion on the solid pattern illustrated in FIG. 18.

FIG. 19 schematically illustrates example positional relationships between the wiring patterns 6B and 6C and the solid lack portion 8A on the solid pattern 7 illustrated in FIG. 18. In a case of the positional relationships illustrated in FIG. 18, the wiring pattern 6C is positioned immediately below the solid lack portion 8A when the printed wiring boards 5 are being transparently viewed in plan (in the direction orthogonal to the printed wiring boards 5).

The simulation apparatus of Embodiment 2, the area of cross talk regions is calculated, and the calculated area is multiplied by a coefficient for obtaining noise caused by the cross talk. Thus, the shift amount of signal characteristics can be simulated.

The cross talk region is a region in which the wiring pattern 6 overlaps an inside portion 8a surrounded by a dotted circle line and existing inside the range in the width direction of the wiring pattern described in Embodiment 1. Said differently, the cross talk region is a region in which the solid lack portion 8 and the wiring pattern 6 overlap within the range in the width direction of the wiring pattern 6. Referring to FIG. 19, a portion of the wiring pattern 6C surrounded by the dotted circular line is the cross talk region.

Figure 20:
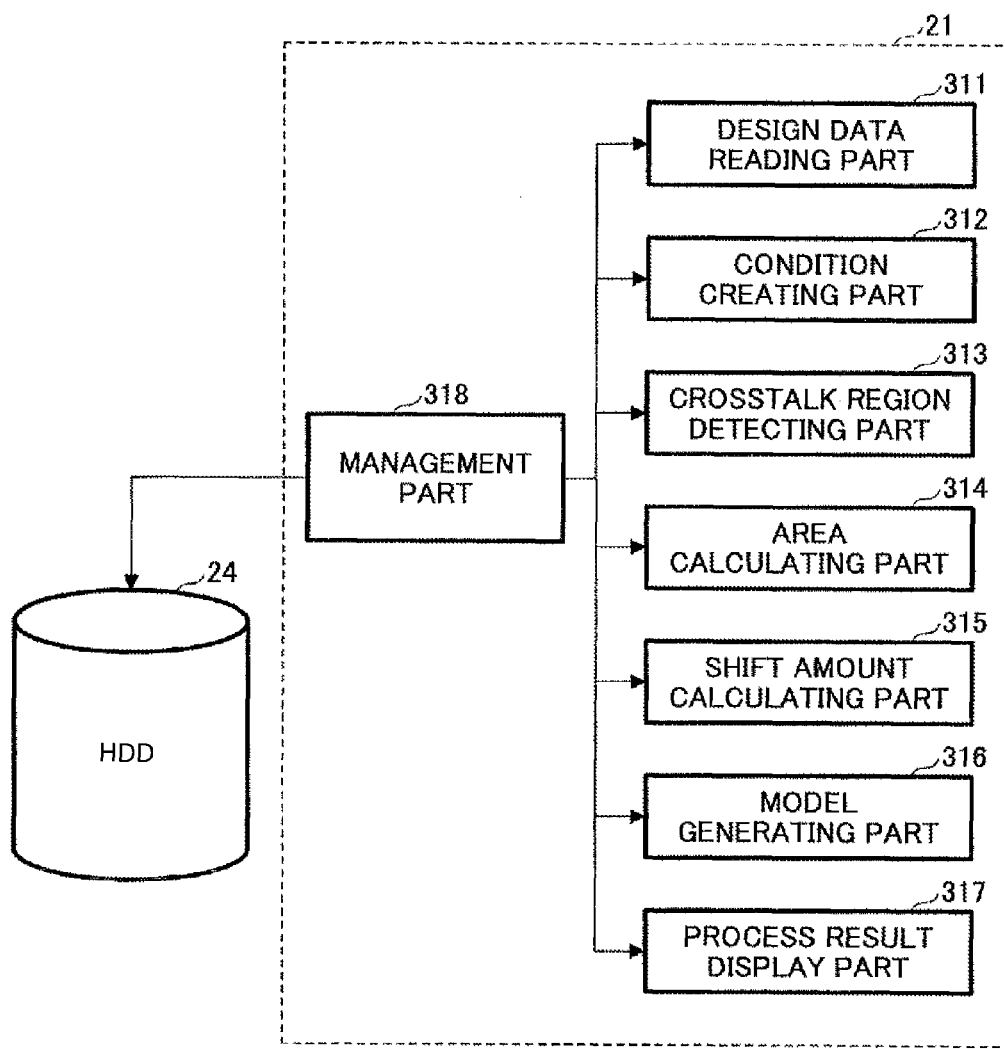
FIG. 20 is an example functional block diagram illustrating a simulation apparatus of Embodiment 2.

FIG. 20 is an example functional block chart illustrating the simulation apparatus of Embodiment 2. The function illustrated in FIG. 20 is demonstrated when the CPU 21 illustrated in FIG. 2 executes a printed wiring board support program stored in the HDD 24.

The functional block demonstrated by the CPU 21 includes a design data reading part 311, a condition creating part 312, a crosstalk region detecting part 313, an area calculating part 314, a shift amount calculating unit 315, a model generating part 316, a process result display part 317 and a management part 318. Hereinafter, differences are mainly described.

The design data reading part 311 carries out the same processes as those of the design data reading part 211 of Embodiment 1.

The condition creating part 312 creates conditions for calculating the shift amount of the characteristic impedances described later based on conditions input via the keyboard 13 or the mouse 14. The input conditions are signal types, a range in the width direction in which the shift amount of signal characteristics caused by the cross talk is calculated, and the length of the mesh sides used for calculating the area of the cross talk region.

The crosstalk region detecting part 313 classifies positional relationships between a solid lack portion 8 and a wiring pattern 6 and between the solid lack portion 8 and another wiring pattern 6 which can be viewed through the solid lack portion 8, when the printed wiring boards 5 are being transparently viewed in plan (in the direction orthogonal to the printed wiring boards 5), based on the X and Y coordinate points of the wiring patterns 6 illustrated in FIG. 5A and the X and Y coordinate points of the solid lack portion 8 illustrated in FIG. 5B.

The area calculating part 314 extracts the wiring pattern 6 to be processed in reference to the signal types which are transmitted by the wiring patterns 6 and created by the condition creating part 312, and calculates the area of cross talk regions existing in the range in the width direction in which the strength of the cross talk is calculated. As described above, the cross talk region is a region in which the solid lack portion 8 and the wiring pattern 6 overlaps within the range in the width direction of the wiring pattern 6. Therefore, the shift amount of the signal characteristics is calculated by the simulation apparatus of Embodiment 2 using the area of the solid lack portions 8.

The shift amount calculating unit 315 calculates the strength of the cross talk as the shift amount of the signal characteristics of the wiring patterns 6 to be processed using the positional relationships between the wiring patterns 6 and the solid lack portion 8 obtained by the crosstalk region detecting part 313 and the area of the cross talk regions calculated by the area calculating part 314.

The model generating part 316 obtains the impedances of the wiring patterns 6 from the start coordinate points to the end coordinate points by integrating the values of predetermined sections of the characteristic impedances obtained by the impedance calculation unit 315 from the start coordinate points to the end coordinate points of the wiring patterns 6. Thus, simulation models of the wiring patterns 6 are generated.

The process result display part 317 displays the calculation results obtained by the impedance calculation unit 215 or the simulation models generated by the model generating part 316 on the display screen 12A of the display 12 illustrated in FIG. 1. The contents of the display are described later.

The management part 318 administers storage of data in the HDD 24.

FIG. 21 is a table illustrating the strength of cross talk in unit areas of cross talk regions which are used in the simulation apparatus of Embodiment 2.

The table illustrated in FIG. 21 includes data used for calculating the strength of the cross talk as indexes of measuring the shift amount of the signal characteristics. The strength is illustrated as noise per unit area of the cross talk regions relative to the dielectric constants of the dielectric layers and the interlayer distances.

FIG. 22 is an example table of correction coefficients used in calculating the strength of cross talk in the simulation apparatus of Embodiment 2. The correction coefficients are determined in response to distance between the wiring patterns and distances between the wiring patterns and the solid lack portions 8.

The distance between the wiring patterns 6 is measured when the printed wiring boards 5 are being transparently viewed in plan (in the direction orthogonal to the printed wiring boards 5). Referring back to FIG. 19, the distance is between the wiring patterns 6B and 6C. Referring back to FIG. 19, the distance between the wiring pattern 6 and the solid lack portion 8 is an interval (offset) between the wiring pattern 6B and the solid lack portion 8A.

Figure 23:
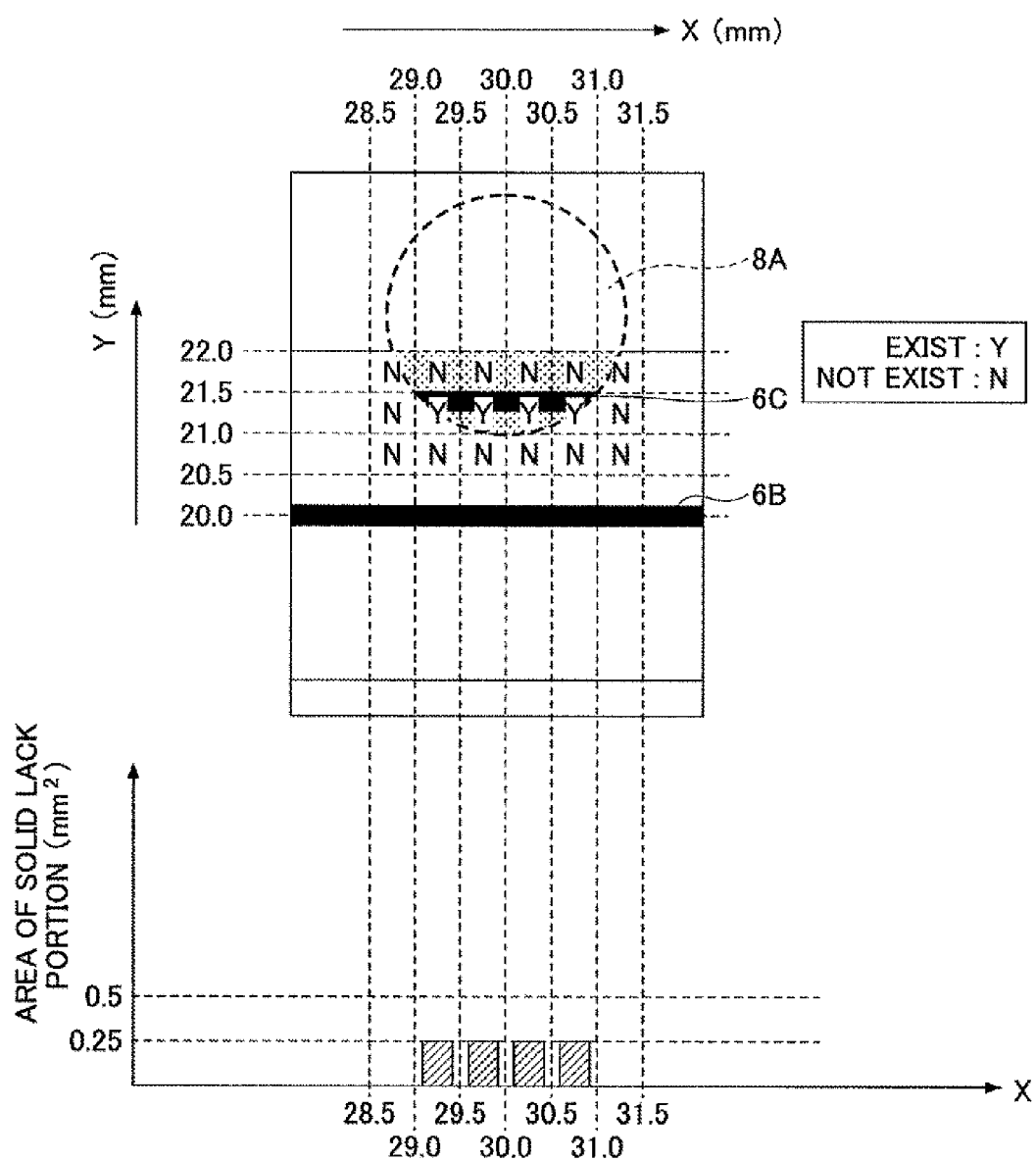
FIG. 23 illustrates calculation of the area of cross talk regions used in calculating the strength of cross talk with the simulation apparatus of Embodiment 2.

FIG. 23 illustrates calculation of the area of cross talk regions used in calculating the strength of cross talk with the simulation apparatus of Embodiment 2.

The crosstalk region detecting part 313 calculates the area of the cross talk regions. The calculation of the area is carried out as follows. A region from the start coordinate point to the end coordinate point of the wiring pattern 6 to be calculated to obtain the shift amount of the signal characteristics is divided into square meshes having predetermined square areas from the start coordinate point to the end coordinate point. Then, it is determined whether the solid lack portions 8 and the wiring patterns 6 exist in any of the meshes.

When there exists the solid lack portion 8 and the wiring pattern 6 in at least a part of the mesh to be determined, in that mesh a solid lack portion is determined to exist in the cross talk region indicated by "1". Said differently, the mesh is determined not to exist in the cross talk region when the solid lack portion 8 and the wiring pattern 6 do not simultaneously exist.

The length of the mesh side is determined to be a value designated by Formula 3.

$$\text{Length of mesh side} = \text{Rise time} \times \text{Transmitting velocity/Arbitrary divided number} \quad \text{Formula 3}$$

However, a drop time may be used instead of or in addition to the rise time.

It is presumed that the length of the mesh side is 0.5 mm. The smallest coordinate point among the coordinate points of four corners of the meshes is used for the coordinate point of the mesh. For example, the value of the lower left coordinate point is used for the coordinate point of the mesh in FIG. 23.

Referring to FIG. 23, it is determined whether the cross talk region exists in the meshes included in a range of X=28.5 through 31.5 and Y=20.0 through 22.0. Referring to FIG. 23, the mesh in which the cross talk region is determined to exist is indicated by reference "Y", and the mesh in which the cross talk region is determined not to exist is indicated by reference "N".

Referring to FIG. 23, the cross talk regions are a portion of the wiring pattern 6C which can be viewed through the solid lack portion 8A in a manner similar to FIG. 19. The calculation results of areas of the meshes are 0 mm$^2$ in the section of X=28.5 through 29.0; 0.25 mm$^2$ in the section of X=29.0 through 29.5; 0.25 mm$^2$ in the section of X=29.5 through 30.0; 0.25 mm$^2$ in the section of X=30.0 through 30.5; 0.25 mm$^2$ in the section of X=30.5 through 31.0; and 0 mm$^2$ in the section of X=31.0 through 31.5.

FIG. 24 is an example table including results of determination illustrated in FIG. 23 and results of extracting distances between the wiring patterns.

The mesh in which the cross talk region is determined to exist the cross talk region is indicated by a flag "1", and the mesh in which the cross talk region is determined to not exist is indicated by a flag "0". The flag is used when the shift amount calculating unit 315 calculates the strength of the cross talk.

The shift amount calculating unit 315 selects the noise per unit area from the table illustrated in FIG. 21 using the dielectric constant and the interlayer distance included in the CAD data. The shift amount calculating unit 315 selects the correction coefficient from the table illustrated in FIG. 22 using the positional data included in the CAD data and the distance between the wiring patterns illustrated in FIG. 24. The shift amount calculating unit 315 calculates the strength of the cross talk per unit area using Formula 4.

$$\text{Strength of cross talk} = \text{Noise per unit area} \times \text{Correction coefficient} \quad \text{Formula 4}$$

The strengths of cross talk per unit area calculated by the shift amount calculating unit 315 based on Formula 4 are integrated from the start coordinate point to the end coordinate point of the wiring pattern 6 in a manner similar to the characteristic impedances per unit area in Embodiment 1. Thus, the integration of the strengths of the cross talk are obtainable.

Thereafter, the simulation model (wiring model) is generated by the model generating part 316 in a manner similar to Embodiment 1.

As described, according to the simulation apparatus of Embodiment 2, the area of the cross talk regions is calculated and the strength of cross talk is calculated. Therefore, when the wiring patterns which transmit relatively important signals are selected from a large number of the wiring patterns 6, it is possible to easily specify the wiring pattern which has a great strength of cross talk and transmits the relatively important signals. Such important wiring patterns transmitting the relatively important signals may be selected in reference to the attributes (signal types or signal names of transmitted signals) of the wiring patterns 6. Therefore, it is unnecessary to calculate all of the wiring patterns 6. Therefore, it is possible to efficiently simulate the wiring pattern by reducing the number of the processes.

Further, since it is possible to calculate strength of cross talk in consideration of minute vacancies in patterns (e.g. solid lack portions) using CAD data, it is possible to specify a wiring greatly influencing signal characteristics in consideration of the vacancies in patterns in designing printed wiring boards 5 which use high speed signals.

The simulation apparatus of Embodiment 2 may be combined with the simulation apparatus of Embodiment 1. Said differently, both the shift amount of the characteristic impedances and the influence of the cross talk may be considered in simulating the shift amount of the signal characteristics.

For example, an eye pattern is produced using the characteristic impedances of Embodiment 1, and the strength of cross talk of Embodiment 2 may be superposed as noise.

Figure 25:
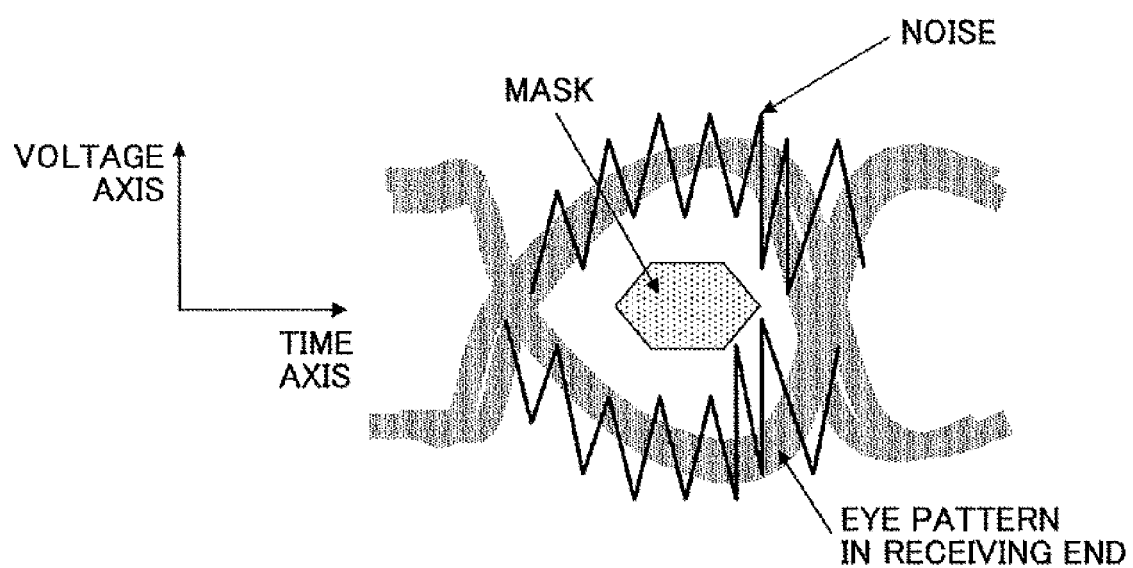
FIG. 25 schematically illustrates an example of an eye pattern which is obtained by sampling many signal waveforms over time and graphically overlapping these signal waveforms.

FIG. 25 schematically illustrates an example of the eye pattern, which is obtained by sampling many signal waveforms over time and graphically overlapping these signal waveforms.

When the waveforms substantially overlap at plural positions, for example, timings and voltages of the waveforms are the same, the waveforms have a good quality. When the waveforms deviate at various positions, for example, timings and voltages of the waveforms are different, the waveforms have a bad quality and jitter becomes bad.

When the simulation apparatuses of Embodiments 1 and 2 are combined, the noise generated by the cross talk is superposed on the eye pattern and may be displayed on the display screen 12A of the display 12. With this, the size of the eye pattern may be evaluated without a great number of calculations. Then, a designer can evaluate the signal characteristics of a wiring pattern in the vicinity of a solid lack portion. The production of the eye pattern and the superposition of the noise may be carried out by an eye pattern processing part 319 as a function of the CPU 21.

Embodiment 3

Figure 26:
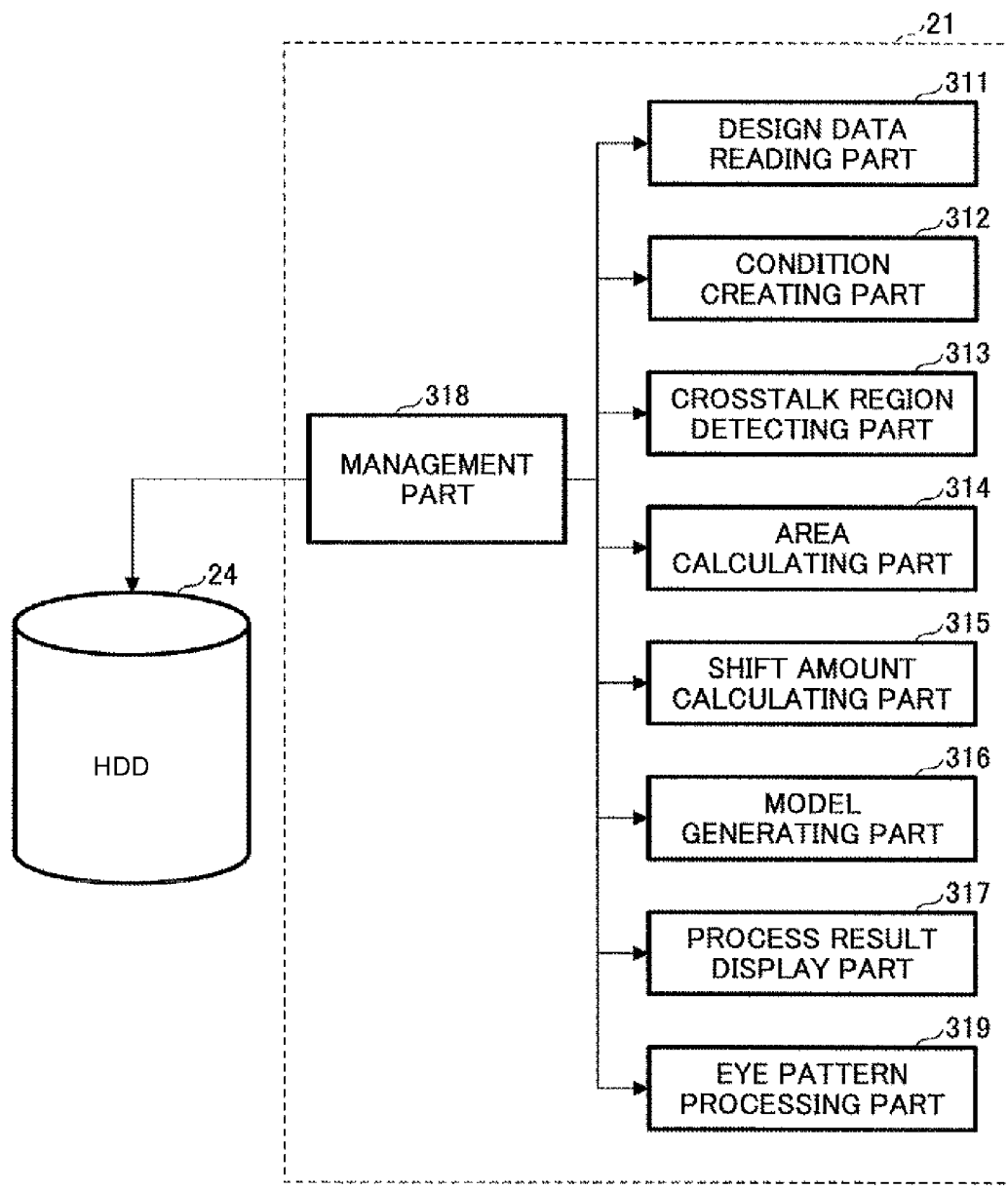
FIG. 26 is an example functional block diagram illustrating a simulation apparatus of Embodiment 3.

FIG. 26 is an example functional block chart illustrating a simulation apparatus of Embodiment 3.

The simulation apparatus of Embodiment 3 uses the eye pattern of Embodiment 2 to extract a wiring pattern having a small time axis margin and a small voltage axis margin. This extraction process is carried out by the eye pattern processing part 319. The functional blocks of the simulation apparatus of Embodiment 3 have a structure similar to the functional blocks of the simulation apparatus of Embodiment 2. The functional block of an eye pattern processing part 319 is added to the functional blocks of the simulation apparatus of Embodiment 2. Hereinafter, a determination process carried out by the eye pattern processing part 319 is described. The eye pattern is basically the same as that illustrated in FIG. 25.

The time axis margin is a margin between a mask and an eye pattern or between the mask and noise in the time axis direction. The voltage axis margin is a margin between the mask and the eye pattern or between the mask and the noise in the voltage axis direction. There are various methods of calculating the minimum time axis margin and the minimum voltage axis margin. For example, referring to FIG. 25, the minimum time axis margin is obtainable by calculating with the eye pattern processing part 319 the smaller one of margins between two apexes of the mask in a hexagonal shape along the time axis and the eye pattern or the smaller one of margins between the two apexes of the mask and the noise. Referring to FIG. 25, the smaller voltage axis margin is obtainable by calculating with the eye pattern processing part 319 the smaller one of margins between four apexes of the mask along the voltage axis or the smaller one the eye pattern and margins between the four apexes of the mask and the noise, for example.

Figure 27A:
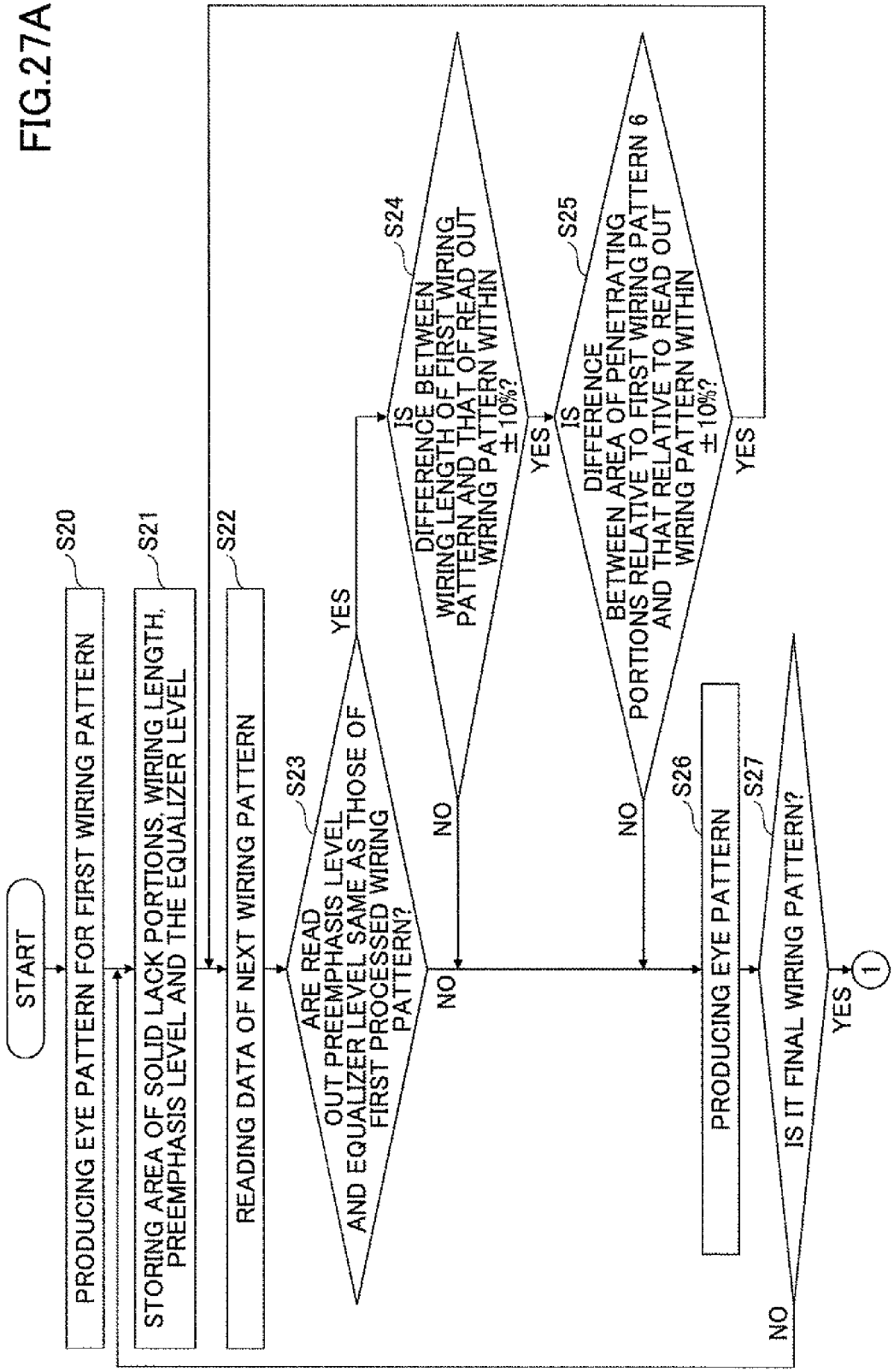
FIG. 27A and FIG. 27B are an example flow chart illustrating a determination process with the simulation apparatus of Embodiment 3.
Figure 27B:
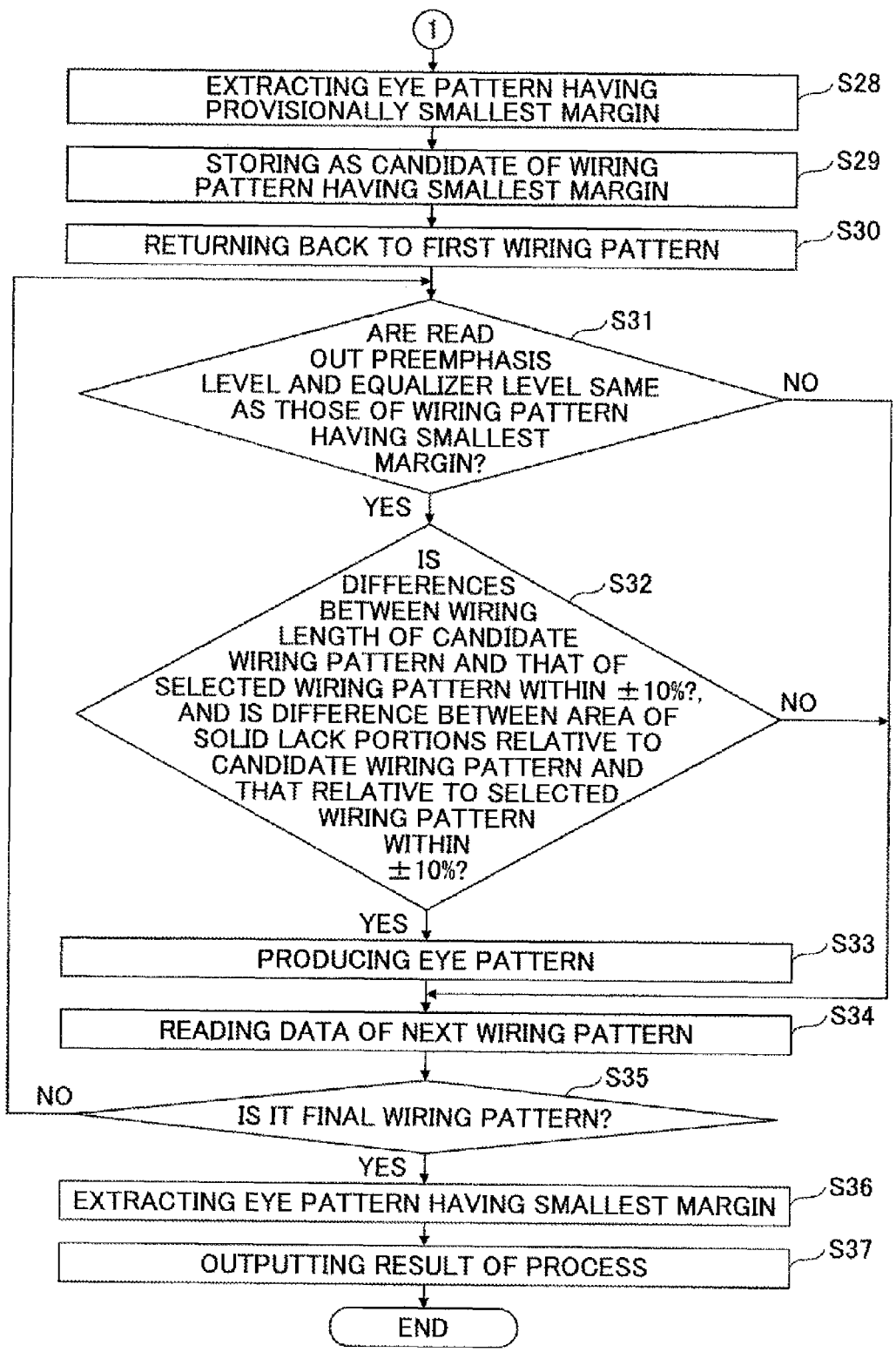

FIG. 27A and FIG. 27B are an example flow chart illustrating a determination process with the simulation apparatus of Embodiment 3. Referring to FIG. 27A and FIG. 27B, an additional determination process is carried out by the eye pattern processing part 319.

The simulation apparatus extracts a wiring pattern 6 of which degradation level of the signal characteristics is high using the observation of the eye pattern, the result of calculating the area of the solid lack portions, the wiring length of the wiring pattern 6, a preemphasis level, and an equalizer level.

Data indicating the area of the solid lack portions 8 from the start coordinate point to the end coordinate point, the wiring length, the preemphasis level and the equalizer level concerning the wiring pattern 6 which has been selected using the attribute of the signal name are stored in the HDD 24 by the condition creating part 212 when the processes illustrated in FIG. 27A and FIG. 27B are carried out. The identifier of the wiring pattern 6 is associated with the data and stored in the HDD 24 by the condition creating part 212.

In step S20, the eye pattern processing part 319 produces an eye pattern for the wiring pattern 6 which is first calculated.

In step S21, the eye pattern processing part 319 stores data indicating the eye pattern produced in step S20 in association with the data indicating the area of the solid lack portions 8, the wiring length, the preemphasis level and the equalizer level of the wiring pattern and with the identifier of the wiring pattern 6 in the HDD 24.

In step S21, the eye pattern processing part 319 stores data forming the eye pattern produced in step S20 in association with the data indicating the area of the solid lack portions 8, the wiring length, the preemphasis level and the equalizer level of the wiring pattern and with the identifier of the wiring pattern 6 in the HDD 24.

In step S23, the eye pattern processing part 319 determines whether the preemphasis level and the equalizer level in the data read in step S22 are the same as the preemphasis level and the equalizer level in the data of the wiring pattern first processed in step S20.

In step S24 after Yes in step S23, the eye pattern processing part 319 determines whether a difference between the wiring lengths of the wiring pattern 6 first processed in step S20 and the wiring length of the wiring pattern 6 read in step S22 is within ±10%.

In step S25 after Yes in step S24, the eye pattern processing part 319 determines whether a difference between the area of the solid lack portions 8 relative to the wiring pattern 6 first processed in step S20 and the area of the solid lack portions 8 relative to the wiring pattern 6 read in step S22 is within ±10%.

After Yes in step S25, the eye pattern processing part 319 returns to step S22 without producing the eye pattern, and further reads data of the next wiring pattern indicating the area of the solid lack portions 8 relative to the wiring pattern 6, the wiring length of the wiring pattern 6, the preemphasis level and the equalizer level. Since the wiring pattern 6 first processed in step S20 is similar to the wiring pattern 6 read in step S22, it is considered that the production of the eye pattern is unnecessary.

In step S26 after No in step S23, No in step S24 or No in step S25, the eye pattern processing part 319 produces the eye pattern and stores the data forming the eye pattern in the HDD 24. Because the areas of the solid lack portions 8 and the wiring lengths concerning the wiring patterns 6 first processed in step S20 and the wiring pattern 6 read in step S22 are not similar, the shapes of the eye patterns may be largely different. Therefore, the eye pattern is newly produced.

In step S27 after step S26, the eye pattern processing part 319 determines whether the wiring pattern whose eye pattern is produced in step S26 is the final wiring pattern among the wiring patterns 6 selected using the attribute information such as the signal name. Said differently, it is determined whether all wiring patterns 6 selected using the signal name are processed.

In step S27, the process returns to step S21 when the eye pattern processing part 319 determines that the wiring pattern is not the final wiring pattern. This is to completely process the wiring patterns 6 selected using the attribute information such as the signal name.

When the eye pattern processing part 319 determines the wiring pattern is the final one in step S27, the eye pattern processing part 319 reads the data forming the eye patterns of the wiring patterns, which eye patterns are produced in steps S20 and S27, from the HDD 24. In step S28, the eye pattern processing part 319 extracts the eye pattern whose margin is provisionally the smallest. The margin may be any one or both of the time axis margin and the voltage axis margin.

In step S29, the eye pattern processing part 319 stores the wiring pattern extracted in step S28 as a candidate of the wiring pattern 6 having the smallest margin. For example, step S29 is carried out by giving a flag indicating the candidate of the wiring pattern 6 having the smallest margin to the candidate of the data forming the wiring pattern 6 having the smallest margin.

In step S30, the eye pattern processing part 319 selects the first wiring pattern 6, and reads data indicating the area of the solid lack portions 8 relative to the first wiring pattern 6, the wiring length of the first wiring pattern 6, the preemphasis level and the equalizer level.

In step S31, the eye pattern processing part 319 determines whether the preemphasis level and equalizer level of the candidate of the wiring pattern 6 having the smallest margin are the same as those of the first wiring pattern 6 which is being processed.

In step S32 after Yes in step S31, the eye pattern processing part 319 determines whether a difference between the wiring length of the candidate of the wiring pattern 6 having the smallest margin and the wiring length of the wiring pattern 6 selected in step S30 is within ±10%, and whether a difference between the area of the solid lack portions 8 relative to the candidate of the wiring pattern 6 having the smallest margin and the area of the solid lack portions 8 relative to the wiring pattern 6 selected in step S30 is within ±10%.

In step S33 after YES is step S32, the eye pattern processing part 319 produces the eye pattern of the wiring pattern 6 which is being processed.

In step S34 after producing the eye pattern, the eye pattern processing part 319 reads data of the next wiring pattern indicating the area of the solid lack portions 8 relative to the wiring pattern 6, the wiring length of the wiring pattern 6, the preemphasis level and the equalizer level for the next wiring pattern.

When it is determined No in step S31 or step S32, the eye pattern processing part 319 brings the process to step S34.

In step S35, the eye pattern processing part 319 determines whether the wiring pattern being processed is the final wiring pattern. In step S35, the eye pattern processing part 319 brings the process back to step S31 when the eye pattern processing part 319 determines that the wiring pattern is not the final wiring pattern.

When the flow returns from step S35 to step S31, the wiring pattern 6 processed in steps S31 thru S33 becomes the wiring pattern read in step S34.

In step S36, the eye pattern processing part 319 extracts the eye pattern whose margin is the smallest. In step S36, the wiring pattern 6 whose margin is the smallest is fixed.

In step S37, the eye pattern processing part 319 outputs the result of the processes. The eye pattern processing part 319 displays the identification number of the wiring pattern 6 whose margin is the smallest on the display screen 12A of the display 12 illustrated in FIG. 1.

In this way, the sequential processes illustrated in FIG. 27A and FIG. 27B end.

With the processes illustrated in FIG. 27A and FIG. 27B, the simulation apparatus of Embodiment 3 can extract the candidates of the wiring patterns whose margins are provisionally the smallest out of all the wiring patterns as a first stage. Then, the simulation apparatus of Embodiment 3 can fix the wiring whose margin is the smallest out of the wiring patterns selected using the signal names or the like without producing eye patterns for all of the wiring patterns as a second stage. In the second stage, the areas of the solid lack portions, the wiring lengths, the preemphasis levels and the equalizer levels are compared between the candidates of the wiring pattern having the smallest margin and all the wiring patterns 6.

The wiring pattern 6 whose margin is the smallest has a signal characteristic in a high degradation level. It is possible to extract a wiring pattern 6 having a large degradation level while using eye patterns and fewer processes in Embodiment 3.

Referring to FIG. 27, the processes can be carried out using values indicating shift amounts of the characteristic impedances instead of the areas of the solid lack portions.

Embodiment 4

In the simulation apparatus of Embodiment 1, the impedance calculation unit 215 generates the simulation model (wiring model) after obtaining specific values of the characteristic impedances. However, a simulation apparatus of Embodiment 4 is different from Embodiment 1 at a point in which the impedance calculation unit 215 generates a simulation model (wiring model) using an area of solid lack portions existing between a start coordinate point and an end coordinate point. In Embodiment 4, the area of the solid lack portions is used as a value indicating a shift amount of signal characteristics. The other structure is the same as that of the simulation apparatus of Embodiment 1. Therefore, the same reference symbols are used for the same structural elements as those of the simulation apparatus of Embodiment 1, and description of these structural elements is omitted.

The impedance calculation unit 215 obtains the area of the solid lack portions existing between the start coordinate point and the end coordinate point of a wiring pattern 6 in a range in a width direction in which shift amounts of characteristic impedances are calculated by integrating the areas of the solid lack portions calculated by the area calculating part 214 from the start coordinate point to the end coordinate point of the wiring pattern 6. The impedance calculation unit 215 of Embodiment 4 generates the simulation model (wiring model) by integrating the areas of the solid lack portions in the range determined by Formula 2 from the start coordinate point to the end coordinate point without multiplying the increment coefficients illustrated in FIG. 8.

Figure 28:
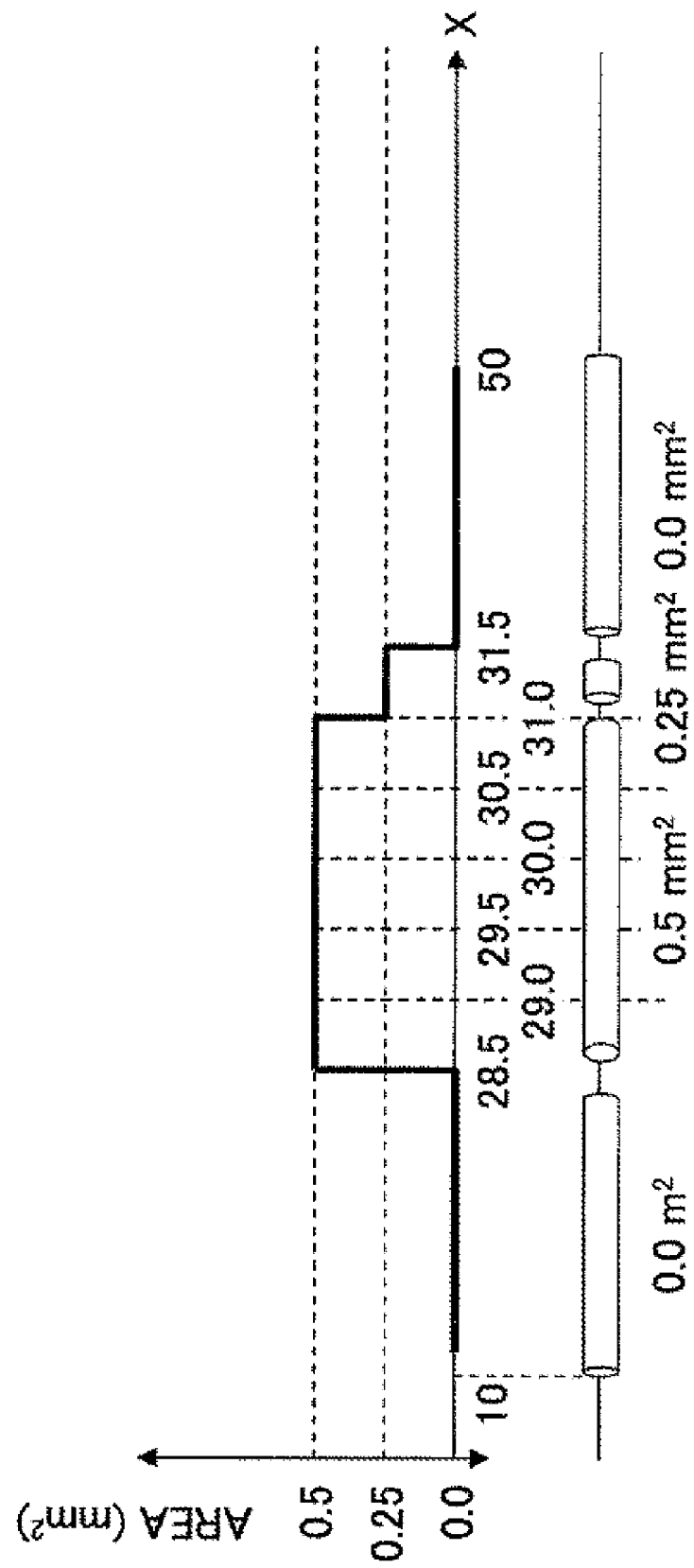
FIG. 28 illustrates an example simulation model (wiring model) generated by a simulation apparatus of Embodiment 4.

FIG. 28 illustrates an example simulation model (wiring model) generated by the simulation apparatus of Embodiment 4. The simulation model illustrated in FIG. 28 illustrates the wiring pattern 6B of No. 4 at the coordinate points of (X, Y)=(10, 20) through (50, 20) in FIG. 5B. Sections in which the areas of the solid lack portions are the same is a continuous simulation model (section model). The continuous simulation model (section model) is interrupted at a point at which the values of the areas of the solid lack portions are different.

By generating the simulation model using the areas of the solid lack portions, a designer can evaluate the shift amounts of the signal characteristics in the wiring pattern and efficiently conduct wiring design.

In Embodiment 4 in comparison with Embodiment 1, the area of the solid lack portions causing signal characteristic degradation is obtained instead of calculating the deviation of the characteristic impedances.

However, the generation of the simulation model using the area of a region causing degradation of the signal characteristic may be applied to Embodiments 2 and 3. When the simulation model is applied to Embodiment 2, the simulation model (wiring model) is generated base on the result of calculation of the area of a cross talk region. In applying the simulation model to Embodiment 3, an eye pattern may be produced based on the calculation result of a cross talk area.

As described, it is possible to provide a simulation apparatus, a simulation method and a simulation program which simulate shift amounts of signal characteristics in wiring patterns in consideration of influences of minute vacancies in patterns without a vast amount of calculations.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A simulation apparatus which simulates a shift in signal characteristics occurring in a wiring pattern formed in a printed wiring board, the simulation apparatus comprising:
   a first database that stores wiring pattern attribute information indicative of attributes of wiring patterns and wiring pattern positional information indicative of positions of the wiring patterns while associating the wiring pattern attribute information with the wiring pattern positional information;
   a second database that stores solid lack portion size information indicative of sizes of solid lack portions and solid lack portion positional information indicative of positions of the solid lack portions while associating the solid lack portion size information with the solid lack portion positional information;
   a third database that stores shift amount information indicative of a shift amount of the signal characteristics relative to positional relationships between the wiring patterns and the solid lack portions;
   an input unit configured to input the wiring pattern attribute information; and
   a shift amount processing unit configured to obtain the shift amount of the signal characteristics in the wiring patterns corresponding to the wiring pattern attribute information input with the input unit based on the wiring pattern positional information corresponding to the wiring pattern attribute information input with the input unit, the solid lack portion positional information, the solid lack portion size information, and the shift amount information.

2. The simulation apparatus according to claim 1, further comprising:
   a model generating part configured to generate a simulation model visually representing the shift amount of the signal characteristics obtained by the shift amount processing unit.

3. The simulation apparatus according to claim 1, wherein the shift amount processing unit obtains the shift amount of the signal characteristics in the wiring pattern using area data of the solid lack portion as the solid lack portion size information.

4. The simulation apparatus according to claim 3, wherein the shift amount processing unit obtains the shift amount of the signal characteristics in the wiring pattern using the area data of the solid lack portion existing, when transparently viewed in a direction orthogonal to the wiring board, within a predetermined range in a width direction of the wiring pattern.

5. The simulation apparatus according to claim 3, wherein the shift amount processing unit obtains the shift amount of the signal characteristics in the wiring pattern every unit area of the solid lack portion divided to have a same predetermined value.

6. The simulation apparatus according to claim 5, wherein the shift amount processing unit obtains the shift amount of the signal characteristics in the wiring pattern after determining existence of the solid lack portion around the wiring pattern within a region larger than the unit area.

7. The simulation apparatus according to claim 5, wherein the unit area is determined based on a rise time or a drop time and a transmitting velocity of a signal transmitted through the wiring pattern.

8. The simulation apparatus according to claim 1, wherein the shift amount of the signal characteristics in the wiring pattern is a shift amount of a characteristic impedance or a shift amount of the signal characteristic caused by cross talk in the wiring pattern.

9. The simulation apparatus according to claim 8, further comprising:
   an eye pattern processing part configured to produce an eye pattern using a shift amount of a characteristic impedance or a shift amount of the signal characteristic caused by cross talk in the wiring pattern.

10. The simulation apparatus according to claim 9, wherein the eye pattern processing part calculates time axis margins between an eye pattern mask and one of eye patterns and noise or voltage axis margins between the eye pattern mask and one of the eye patterns and the noise, and determines the wiring pattern corresponding to the smallest time axis margin or the smallest voltage axis margin.

11. A simulation method of simulating a shift in signal characteristics occurring in a wiring pattern formed in a printed wiring board, the simulation method comprising:
   storing wiring pattern attribute information indicative of attributes of wiring patterns and wiring pattern positional information indicative of positions of the wiring patterns while associating the wiring pattern attribute information with the wiring pattern positional information in a first database;
   storing solid lack portion size information indicative of sizes of solid lack portions and solid lack portion positional information indicative of positions of the solid lack portions while associating the solid lack portion size information with the solid lack portion positional information in a second database;
   storing shift amount information indicative of a shift amount of the signal characteristics relative to positional relationships between the wiring patterns and the solid lack portions in a third database;
   designating the wiring pattern attribute information; and
   obtaining the shift amount of the signal characteristics in the wiring patterns corresponding to the designated wiring pattern attribute information based on the wiring pattern positional information corresponding to the designated wiring pattern attribute information, the solid lack portion positional information, the solid lack portion size information, and the shift amount information by referring to the first, the second and the third databases.

12. A computer program embodied in a computer-readable medium and representing a sequence of instructions, which when executed by a computer included in a simulation apparatus, which simulates a shift in signal characteristics occurring in a wiring pattern formed in a printed wiring board and includes a first database that stores wiring pattern attribute information indicative of attributes of wiring patterns and wiring pattern positional information indicative of positions of the wiring patterns while associating the wiring pattern attribute information with the wiring pattern positional information, a second database that stores solid lack portion size information indicative of sizes of solid lack portions and solid lack portion positional information indicative of positions of the solid lack portions while associating the solid lack portion size information with the solid lack portion positional information, and a third database that stores shift amount information indicative of a shift amount of the signal characteristics relative to positional relationships between the wiring patterns and the solid lack portions, the instructions cause the computer to function as:

a shift amount processing unit configured to obtain the shift amount of the signal characteristics in the wiring pattern corresponding to the wiring pattern attribute information which is input based on the wiring pattern positional information corresponding to the wiring pattern attribute information which is input, the solid lack portion positional information, the solid lack portion size information, and the shift amount information.

* * * * *